(12) United States Patent
Kohara et al.

(10) Patent No.: US 6,633,722 B1
(45) Date of Patent: Oct. 14, 2003

(54) LIGHT GUIDE PLATE WITH ALICYCLIC RESIN

(75) Inventors: Teiji Kohara, Kanagawa-ken (JP); Yuichiro Konishi, Tokyo (JP); Junko Maruyama, Kanagawa-ken (JP); Koji Minami, Kanagawa-ken (JP); Issei Ishimaru, Kanagawa-ken (JP)

(73) Assignee: Nippon Zeon Co., Ltd., Tokyo (JP)

( * ) Notice: Subject to any disclaimer, the term of this patent is extended or adjusted under 35 U.S.C. 154(b) by 0 days.

(21) Appl. No.: 09/674,156

(22) PCT Filed: Apr. 30, 1999

(86) PCT No.: PCT/JP99/02325

§ 371 (c)(1),
(2), (4) Date: Oct. 27, 2000

(87) PCT Pub. No.: WO99/57602

PCT Pub. Date: Nov. 11, 1999

(30) Foreign Application Priority Data

Apr. 30, 1998 (JP) .......................... 10-135982
Sep. 14, 1998 (JP) .......................... 10-259692
Sep. 14, 1998 (JP) .......................... 10-259706

(51) Int. Cl.$^7$ ................................. G02B 6/10
(52) U.S. Cl. ....................................... 385/146
(58) Field of Search ............................ 385/146

(56) References Cited

U.S. PATENT DOCUMENTS 3,954,914 A * 5/1976 Rim et al. .................. 524/411
4,979,799 A * 12/1990 Herbrechtsmeier et al. . 385/142
5,010,119 A * 4/1991 McElrath et al. ........ 428/402.22
5,506,929 A * 4/1996 Tai et al. ..................... 385/146
5,548,670 A * 8/1996 Koike ......................... 385/146
5,771,328 A * 6/1998 Wortman et al. ............. 349/62
5,919,551 A * 7/1999 Cobb et al. ................. 359/530
5,926,601 A * 7/1999 Tai et al. ...................... 349/62
5,999,685 A * 12/1999 Goto et al. .................... 349/65
6,166,125 A * 12/2000 Sugiyama et al. .......... 385/143

FOREIGN PATENT DOCUMENTS

| JP | 8-254615 | 10/1996 | |
| JP | 9-101521 | 4/1997 | |
| JP | 10-300937 | 11/1998 | |
| JP | 75102 A | * 3/2000 | ............ G02B/1/04 |

* cited by examiner

*Primary Examiner*—Lynn Feild
*Assistant Examiner*—Hae Moon Hyeon
(74) *Attorney, Agent, or Firm*—Armstrong, Westerman & Hattori, LLP

(57) ABSTRACT

A light guide plate which is made of a polymeric resin having an alicyclic structure and has recesses for reflection formed on a light reflecting surface, the recesses being so arranged that the density of the recesses increases with the distance from a light source. Each recess is preferably a V-shaped groove each having an angle of 70° to 150° and a depth of 1 μm to 1000 μm or a groove which is long and approximately perpendicular to the direction in which light is incident at any position on the light reflection surface.

12 Claims, 5 Drawing Sheets

LIGHT GUIDE PLATE WITH ALICYCLIC RESIN

BACKGROUND OF THE INVENTION

1. Field of the Invention

The present invention relates to a light guide plate as a component of a plane light source apparatus used as a back-light of a variety of display devices.

2. Description of the Related Art

A light guide plate is one of optical members used in a plane light source apparatus installed in a variety of display devices, for example in a plane light source apparatus of an edge light mode, it plays a role of emitting a light from a light source introduced into the light guide plate while guiding the light in a perpendicular direction with respect to the direction in which the light is incident. In such a light guide plate, its overall emission surface serves as a direct light source of a variety of display devices, so it is required to be comprised of members having a high transparency to attain higher luminance, and to have less luminance spots on the luminescence surface to attain a unified distribution of a light emission amount.

Therefore, in the related art, materials, such as a polymethyl methacrylate (PMMA) and polycarbonate (PC) are used as materials of light guide plates, on the light reflection surface (reflector surface) of the light guide plate is devised to be formed recesses having a variety of shapes as a reflection means for attaining higher luminance, for example, it is known to form grooves causing less light losses when molding the light guide plate (The Japanese Unexamined Patent Publication 1990-165504). Also, there are known means for arranging grooves so that density of an arrangement pattern increases along with the distance from the light source, and for arranging to be a check pattern for further higher luminance (The Japanese Unexamined patent Publication 1994-250025 and 1993-216030).

However, with the materials of the related art, such as PMMA and PC, sufficient front luminance has not yet obtained even if the groove arrangement patterns as above are provided due to reasons of optical characteristics of a refractive index, transparency, etc. which the materials themselves have.

Further, in the PMMA, melting viscosity is high and fluidity is deteriorated at the time of injection molding, while in the PC, when a resin temperature is raised for promoting fluidity, it is liable that the resin hydrolyzes and bubbles. There have been harmful influences, such as generation of luminance spots, deterioration of the front face luminance, which are caused because transferability of a preferable groove shape cannot be obtained actually in a range where the arrangement of the reflection pattern is dense (being distant from the light source).

Furthermore, in recent years, as back-light units becoming thinner and lighter each year, the trend in the light guide plate is also shifting to be thinner and wider in area, and in terms of the shape, instead of a flat plate having a constant thickness, light guide plates of a wedge shape wherein the thickness becomes thinner as becoming distant from the light source are often in use in terms of higher luminance by an effective use of a light and a lighter weight. Thus, the PMMA and PC having a disadvantage in moldability have been coming to face a difficult situation in being used as a thin and wide light guide plate.

In addition to the above, in a wedge shaped light guide plate as above, since a region where the arrangement density of the grooves is increased is a region where the thickness of the plate becomes thinner, the PMMA, etc. are concerned about disadvantages that the plate strength declines due to provision of grooves and deformation while in use as a light guide plate (warps of the plate caused by shrink in the direction to the light emission surface having a small surface) becomes remarkable. There have been demands for a light guide plate material capable of overcoming such size deformation, fulfilling the strength, moldability, high luminance and low luminance spots and attaining to be thin and wide area.

Note that, as disclosed in the Japanese Unexamined Patent Publication 1995-43710, study on making the light guide plate thinner, improving luminance balance on the light emission surface, and reducing the luminance spots along with a luminance line by forming a plurality of grooves of an inversed V shape having projections protruding to outside on both sides of a V-shaped groove. It is also studied to form as one body a pattern of recesses and projections for reflection on the light reflection surface of the light guide plate and recesses and projections for light convergence on the surface of the light guide plate (The Japanese Unexamined Patent Publication 1996-179322).

SUMMARY OF THE INVENTION

An object of the present invention is to provide a light guide plate capable of solving the disadvantages of the related art, being superior in moldability, suppressing hygroscopic deformation little while in use, having sufficient strength, and being made thin and wide, and attaining high luminance and low luminance spots.

The present inventors studied diligently to attain the above objects and found that a light guide plate formed by using a polymeric resin having an alicyclic structure, wherein a reflection surface is formed as a reflection pattern recesses arranged so that the density increases along with the distance from a light source, has preferable moldability, transferability, size stability and strength even in the case of being thin and wide, and able to attain high luminance and low luminance spots, and the present invention was completed.

Namely, a light guide plate of the present invention is comprised of a polymeric resin having an alicyclic structure and has recesses for reflection formed on a light reflecting surface, the recesses being so arranged that the density of the recesses increases with the distance from a light source.

A light guide plate of the present invention is comprised of a polymeric resin having an alicyclic structure comprising recesses for reflection formed on a light reflection surface and projections formed respectively near edges of said recesses.

A light guide plate of the present invention is comprised of a polymeric resin having an alicyclic structure, wherein concave portions and convex portions for light convergence are formed integrally on the light emission surface.

The recesses may be formed for example in dots shape (concaves on a certain part) and may be continuously formed for example in a groove shape (concave on a continuous line). The sectional shape of the recesses may be for example V-shape, U-shape, square shape, etc. among them, the recesses is preferably a groove, more preferably a V-shaped groove. In this case, it is preferable that the V-shaped groove has an angle ($\theta$) of 70° to 150° and a depth ($H_1$) of 1 $\mu$m to 1000 $\mu$m.

In the case that the recesses are grooves, the direction of the grooves is not particularly limited, and may be formed to extend in the direction of approximately parallel direction with respect to a direction in which a light is incident, or extend in the direction of approximately vertical direction with respect to the same. It is preferably formed in the approximately vertical direction with respect to a direction in which a light is incident with respect to at any position on the light reflection surface. In this case, a length of the groove is preferably formed over the full width in the direction on the light reflection surface of the light guide plate.

It is preferable that projections formed respectively near edges of said recesses is further provided. And the ratio of the cross sectional areas of the recesses and the projections in this case is preferably 10:1 to 10:10. In the present invention, the cross sectional area of the recesses and the projection is calculated based on the light reflection surface of the light guide plate on which the recesses and projections are not formed. Also, the ratio is a ratio of a cross sectional area of the recess and that of the projection when one projection is formed near the edge of one recess. While, when a plurality of projections are arranged near the both side edges of one recess, it is a ratio of the cross sectional area of the recess and that of one of the plurality of projections arranged near the both side edges.

When the recess is in dot shape formed in a dispersed way, the projection is preferably formed at an edge thereof. While when the recess is a groove, the projection is preferably formed respectively near one side edge or near the both side edge, and more preferably formed on the both sides thereof. The projection is preferably a protruding portion.

The polymeric resin having an alicyclic preferably contains at least 10 wt % of repeating units composed of an alicyclic structure not having norbornenes structure in the repeating units composed of all alicyclic structures.

The light guide plate of the present invention is preferably molded by injection molding.

Preferably, concave portions and convex portions for light convergence are formed integrally on a light emission surface. The concave portions and convex portions for light convergence are not particularly limited as far as it serves as making the light emitted from the light emission surface of the light guide plate as close as possible to the front surface (0°), but preferably repeating units of a prism shape.

Effects

The polymeric resin having an alicyclic structure used in the present invention excels in moldability processing, such as fluidity and heat-resistence, of the resin while being molded, so recesses for reflection can be formed on the light reflection surface without any transfer deficiencies, and a light guide plate able to be made thin and wide, superior in optical characteristics, such as transparency. Accordingly, a light guide plate having high luminance by effectively utilizing a light (particularly, the front face luminance is remarkably improved), and little luminance spots can be provided. Also, the polymeric resin having an alicyclic structure is superior in strength physicality and has characteristics that size deformation by hygroscopic deformation is small, thus, even when reflection recesses are formed on a wedge shape wherein the thickness gradually gets thinner, size deformation by a warp, etc. at the time of being used is hard to occur and there is a small possibility that the light guide plate itself is damaged. Furthermore, the polymeric resin having an alicyclic structure has a small specific gravity comparing with the PMMA and PC, so the light guide plate can be made light, consequently, a back-light unit can be made light. Accordingly, the present invention can provide a light guide plate being superior in moldability, having little hygroscopic deformation and sufficient strength, able to be made thin and wide, and capable of attaining high luminance and low luminance spots.

Also, by forming the projection portion near an edge of said recess, luminance spots are further reduced.

Furthermore, by forming integrally concave portions and convex portions for light convergence on the light emission surface, it becomes unnecessary to provide a light convergence sheet separately from a light guide plate so assembly procedures of a back light unit can be simplified.

Light Guide Plate

A "light guide plate" in the present invention is not specifically limited the use, but indicates those which used in flat light source apparatuses used as a back-light of, for example, office-use and home-use products, such as personal computers of lap-top, notebook, book, palm-top and other types, mobile computers, word processors, electronic pocketbooks, electronic dictionaries, liquid crystal televisions to be hang on the wall, etc.; illumination signs; a display window of pinball machines, cellular phones, pagers and automatic teller machines; light tables, viewers and other display devices.

A light guide plate of the present invention may be either a flat shape having a constant thickness or for example a wedge shape wherein the thickness gradually gets thinner from one end to the other. When the light guide plate is flat, the thickness is normally 0.1 to 10 mm, preferably, 1 to 5 mm. While when the light guide plate is wedge shaped, the thickness of a thick part is normally 0.5 to 10 mm, preferably, 1 to 5 mm and the thickness of a thin part is normally 0.1 to 5 mm, preferably, 0.1 to 1 mm.

A polymeric resin having an alicyclic structure used in the present invention is superior in moldability, so a thin light guide plate can be molded.

The polymeric resin having an alicyclic structure used in the present invention is superior in moldability, so light guide plates of from a small screen size of about 1 inch to a large screen size of about 20 inches can be molded, and it is preferable when molding a light guide plate of particularly 10 inches or more, because characteristics that a fine pattern of recesses and projections be accurately transferred due to excellent fluidity of the resin.

Polymeric Resin Having Alicyclic Structure

The polymeric resin having an alicyclic structure used in the present invention has an alicyclic structure at the main chain and/or side chain and it is preferable that the main chain includes the alicyclic structure in terms of mechanical strength and heat resistance, etc.

As the alicyclic structure, there are a cycloalkane structure, cycloalkene structure, etc. From the viewpoint of the mechanical strength, heat resistance, etc., one having a cycloalkane structure is most preferable.

The number of carbon atoms comprising the alicyclic structure is not particularly limited, but is normally 4 to 30, preferably 5 to 20, more preferably 5 to 15, at which time the mechanical strength, the heat resistance and moldability characteristics are well balanced.

The percentage of the repeating units composed of alicyclic structure included in the polymeric resin having an alicyclic structure may be suitably selected in accordance with the object of use, but normally is 30 to 100 wt %, preferably 50 to 100 wt %, more preferably 70 to 100 wt %, most preferably 90 to 100 wt %. If the percentage of the repeating units having an alicyclic structure in the polymeric resin containing an alicyclic structure is excessively small, the heat resistance is inferior, but by containing in the range of 30 to 100 wt %, the mechanical strength, the heat resistance, etc. are well balanced.

Further, the percentage of the repeating units comprised of alicyclic structures without norbornane structures in the whole alicyclic structures in the polymeric resin containing an alicyclic structure used in the present invention may be suitably selected in accordance with the object of use, but the more the more preferable as a light guide plate and is normally at least 10 wt %, preferably at least 20 wt %, more preferably at least 30 wt %. The larger the percentage of repeating units comprised of alicyclic structures without norbornane structures, the better the fluidity and transferability of the resin at molding further improve. Particularly, by having such specific repeating units, the front luminance of the light guide plate to be obtained improves as well as the light resistance, thus, a light guide plate having stable intensified front luminance and little luminance spots to be well balanced can be obtained even by a light exposure from the light source by long time use.

Note that the balance other than the repeating units comprised of alicyclic structures in the polymeric resin containing an alicyclic structure is not particularly limited and is suitably selected in accordance with the object of use.

As specific examples of the polymeric resin containing an alicyclic structure, for example, a norbornene-based polymer, a monocyclic cyclic olefin-based polymer, a cyclic conjugated diene-based polymer, a vinyl alicyclic hydrocarbon polymer, and hydrogenates of the same may be mentioned. Among these, a norbornene-based polymer and a cyclic conjugated diene-based polymer are preferable, and norbornene-based polymer is more preferable.

The norbornene-based polymer is not particularly limited. For example, the polymers disclosed in Japanese Unexamined Patent Publication (Kokai) 1991-14882, Japanese Unexamined Patent Publication (Kokai) 1991-122137, etc. may be used. Specifically, a ring-opening polymer of a norbornene-based monomer and its hydrogenate, an addition polymer of norbornene-based monomers, an addition polymer of a norbornene-based monomer and a copolymerizable vinyl compound, etc. may be mentioned. Among these, a ring-opening polymer of a norbornene-based monomer and its hydrogenate, an addition polymer of norbornene-based monomers, an addition polymer of a norbornene-based monomer and a copolymerizable vinyl compound are preferable. A ring-opening polymer of a norbornene-based monomer and its hydrogenate is particularly preferable. A ring-opening polymer of a norbornene-based monomer and its hydrogenate containing a norbornene-based monomer not having a norbornane ring is further preferable, and hydrogenate of a ring-opening polymer of a norbornene-based monomer containing a norbornene-based monomer not having a norbornane ring is most preferable.

As a norbornene-based monomer, there are ones not having a norbornane ring and ones having one or more norbornane rings.

As norbornene-based monomers not having a norbornane ring, for example, bicyclo[2.2.1]-hept-2-ene (common name norbornene), 5-methyl-bicyclo[2.2.1]-hept-2-ene, 5,5-dimethyl-bicyclo[2.2.1]-hept-2-ene, 5-ethyl-bicyclo[2.2.1]-hept-2-ene, 5-butyl-bicyclo[2.2.1]-hept-2-ene, 5-hexyl-bicyclo[2.2.1]-hept-2-ene, 5-octyl-bicyclo[2.2.1]-hept-2-ene, 5-octadecyl-bicyclo[2.2.1]-hept-2-ene, 5-ethylidene-bicyclo[2.2.1]-hept-2-ene, 5-methylidene-bicyclo[2.2.1]-hept-2-ene, 5-vinyl-bicyclo[2.2.1]-hept-2-ene, 5-propenyl-bicyclo[2.2.1]-hept-2-ene, 5-methoxy-carbonyl-bicyclo[2.2.1]-hept-2-ene, 5-cyano-bicyclo[2.2.1]-hept-2-ene, 5-methyl-5-methoxycarbonyl-bicyclo[2.2.1]-hept-2-ene, 5-methoxycarbonyl-bicyclo[2.2.1]-hept-2-ene, 5-ethoxycarbonyl-bicyclo[2.2.1]-hept-2-ene, 5-methyl-5-ethoxycarbonyl-bicyclo[2.2.1]-hept-2-ene, bicyclo[2.2.1]-hept-5-enyl-2-methylpropionate, bicyclo[2.2.1]-hept-5-enyl-2-methyloctanate, bicyclo[2.2.1]-hept-2-ene-5,6-dicarboxylate anhydride, 5-hydroxymethyl-bicyclo[2.2.1]-hept-2-ene, 5,6-di(hydroxymethyl)-bicyclo[2.2.1]-hept-2-ene, 5-hydroxy-i-propyl-bicyclo[2.2.1]-hept-2-ene, 5,6-dicarboxy-bicyclo[2.2.1]-hept-2-ene, bicyclo[2.2.1]-hept-2-ene-5,6-dicarboxylate imide, 5-cyclopentyl-bicyclo[2.2.1]-hept-2-ene, 5-cyclohexyl-bicyclo[2.2.1]-hept-2-ene, 5-cyclohexenyl-bicyclo[2.2.1]-hept-2-ene, 5-phenyl-bicyclo[2.2.1]-hept-2-ene, tricyclo[4.3.0.1$^{2,5}$]-deca-3,7-diene (common name dicyclopentadiene), tricyclo[4.3.0.1$^{2,5}$]-deca-3-ene, tricyclo[4.4.0.1$^{2,5}$]-undeca-3,7-diene, tricyclo[4.4.0.1$^{2,5}$]-undeca-3,8-diene, tricyclo[4.4.0.1$^{2,5}$]-undeca-3-ene, tetracyclo[7.4.0.1$^{10,13}$.0$^{2,7}$]-trideca-2,4,6-11-tetraene (also called 1,4-methano-1,4,4a,9a-tetrahydrofluorene), tetracyclo[8.4.0.1$^{11,14}$.0$^{3,8}$]-tetradeca-3,5,7,12-11-tetra ene (also called 1,4-methano-1,4,4a,5,10,10a-hexahydro anthracene), etc. may be mentioned.

As norbornene-based monomers having one or more norbornane rings, for example, tetracyclo[4.4.0.1$^{2,5}$.1$^{7,10}$]-dodeca-3-ene (also simply called tetracyclododecene), 8-methyl-tetracyclo[4.4.0.1$^{2,5}$.1$^{7,10}$]-dodeca-3-ene, 8-ethyl-tetracyclo[4.4.0.1$^{2,5}$.1$^{7,10}$]-dodeca-3-ene, 8-methylidene-tetracyclo[4.4.0.1$^{2,5}$.1$^{7,10}$]-dodeca-3-ene, 8-ethylidene-tetracyclo[4.4.0.1$^{2,5}$.1$^{7,10}$]-dodeca-3-ene, 8-vinyl-tetracyclo[4.4.0.1$^{2,5}$.1$^{7,10}$]-dodeca-3-ene, 8-propenyl-tetracyclo[4.4.0.1$^{2,5}$.1$^{7,10}$]-dodeca-3-ene, 8-methoxycarbonyl-tetracyclo[4.4.0.1$^{2,5}$.1$^{7,10}$]-dodeca-3-ene, 8-methyl-8-methoxycarbonyl-tetracyclo[4.4.0.1$^{2,5}$.1$^{7,10}$]-dodeca-3-ene, 8-hydroxymethyl-tetracyclo[4.4.0.1$^{2,5}$.1$^{7,10}$]-dodeca-3-ene, 8-carboxy-tetracyclo[4.4.0.1$^{2,5}$.1$^{7,10}$]-dodeca-3-ene, 8-cyclopentyl-tetracyclo[4.4.0.1$^{2,5}$.1$^{7,10}$]-dodeca-3-ene, 8-cyclohexyl-tetracyclo[4.4.0.1$^{2,5}$.1$^{7,10}$]-dodeca-3-ene, 8-cyclohexenyl-tetracyclo[4.4.0.1$^{2,5}$.1$^{7,10}$]-dodeca-3-ene, 8-phenyl-tetracyclo[4.4.0.1$^{2,5}$.1$^{7,10}$]-dodeca-3-ene, pentacyclo[6.5.1.1$^{3,6}$.0$^{2,7}$.0$^{9,13}$]-pentadeca-3,10-diene, pentacyclo[7.4.0.1$^{3,6}$.1$^{10,13}$.0$^{2,7}$]-pentadeca-4,11-diene, etc. may be mentioned.

These norbornene-based monomers may be used alone or in combinations of two or more types.

The content of a norbornene based monomer not having a norbornane ring in the whole norbornene based monomer may be suitably selected in accordance with the preferable ratio of repeating units composed of alicyclic structures not having the above norbornane structure, but is normally at least 10 wt %, preferably 20 wt %, more preferably 30 wt % and not more than 100 wt %.

As the vinyl compound copolymerizable with norbornene based monomers, for example, ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicosene, and other $C_2$ to $C_{20}$ ethylene or α-olefins; cyclobutene, cyclopentene, cyclohexene, 3,4-dimethylcyclopentene, 3-methylcyclohexene, 2-(2-methylbutyl)-1-cyclohexene, cyclooctene, 3a,5,6,7a-tetrahydro-4,7-methano-1H-indene, and other cycloolefins; 1,4-hexadiene, 4-methyl-1,4-hexadiene, 5-methyl-1,4-hexadiene, 1,7-octadiene, and other nonconjugated dienes, etc. may be mentioned.

These vinyl-based compounds copolymerizable with norbornene based monomers may be used alone or in combinations of two or more types.

The ring-opening (co)polymer of a norbornene-based monomer may be obtained by causing ring-opening (co) polymerization of a norbornene-based monomer in a solvent or without a solvent normally at a polymerization temperature of −50 to 100° C. and a polymerization pressure of 0 to 50 kg/cm$^2$ using as a ring-opening polymerization catalyst a catalyst system comprised of a halide, acetate, or acetylacetone compound of ruthenium, rhodium, palladium, osmium, iridium, platinum, and another metal and a reducing agent or a catalyst system comprised of a halide or acetylacetone compound of titanium, vanadium, zirconium, tungsten, molybdenum, or another metal and an organoaluminum compound. The catalyst system may have added to it molecular oxygen, alcohol, ether, peroxide, carboxylate, an acid anhydride, acid chloride, ester, ketone, nitrogenous compound, sulfurous compound, halide compound, molecular iodine, or other Lewis acid or other tertiary component to enhance the polymerization activity or selectivity of the ring-opening polymerization.

The hydrogenated ring-opening polymer of norbornene-based monomer may be obtained by the method of hydrogenating a ring-opening (co)polymer in the presence of a hydrogenation catalyst by an ordinary method. The hydrogenates are not particularly limited but heterogeneous system catalysts or homogeneous system catalysts are normally used. As the heterogeneous system catalysts, for example, nickel, palladium, platinum, or solid catalysts which makes these metals be carried by a catalyst/carrier of carbon, silica, diatom earth, alumina, titanium oxide, etc.: nickel/silica, nickel/diatom earth, nickel/alumina, palladium/carbon, palladium/silica, palladium/diatom earth, palladium/alumina, etc. may be mentioned. As a homogeneous catalysts, for example, catalysts combined by transition metal compound and alkyl aluminum metal compound or alkyl lithium, such as catalysts combined by cobalt acetic acid/triethyl aluminum, cobalt acetic acid/triisobutyl aluminum, nickel acetic acid/triethyl aluminum, nickel acetic acid/triisobutyl aluminum, nickel acetylacetonato/triethyl aluminum, nickel acetylacetonato/triisobutyl aluminum, titanosenchloride/n-butyl lithium, zirconosenchloride/n-butyl lithium may be mentioned.

These hydrogenated catalysts may be used alone and in combination of two or more types. The use amount of the hydrogenated catalysts in 100 wt % of polymer is normally 0.01 to 100 wt %, preferably 0.1 to 50 wt %, more preferably 1 to 30 wt %. The hydrogenation reaction is performed normally under a hydrogen pressure of 1 to 150 kg/cm$^2$, in a temperature range of 0 to 250° C. and a reaction time of 1 to 20 hours. The polymeric resin having an alicyclic structure of the present invention can be obtained by removing the hydrogenated catalyst by filtering after the above hydrogenation reaction and drying to set. When a homogeneous system catalyst was used as the hydrogenation catalyst, it can be obtained by lowering activation of the catalyst by adding alcohol or water to make it insoluble in a solution, then filtering, setting and drying the same.

The addition copolymer of the norbornene-based monomer, norbornene-based monomer and copolymerizable vinyl-based compound may be obtained for example by the method of causing copolymerization of the monomer component in a solvent or without a solvent in the presence of a catalyst system comprised of a titanium, zirconium, or vanadium compound and organoaluminum compound normally at a polymerization temperature of −50 to 100° C. and a polymerization pressure of 0 to 50 kg/cm$^2$.

These norbornene based polymers may be used alone or in combinations of two or more types.

As the monocyclic cyclic olefin-based polymer, for example, the addition polymers of cyclohexene, cycloheptene, cyclooctene, and other monocyclic cyclic olefin-based monomers disclosed in Japanese Unexamined Patent Publication (Kokai) 1989-66216 may be mentioned.

As the cyclic conjugated diene-based polymer, for example, the polymers obtained by 1,2- or 1,4-addition polymerization of cyclopentadiene, cyclohexadiene, or other cyclic conjugated diene-based monomers and their hydrogenates etc. disclosed in Japanese Unexamined Patent Publication (Kokai) 1994-136057 or Japanese Unexamined Patent Publication (Kokai) 1995-258318 may be mentioned.

As the vinyl alicyclic hydrocarbon polymer, for example, a polymer of a vinyl cyclohexene or vinyl cyclohexane or other vinyl alicyclic hydrocarbon monomer or its hydrogenate disclosed in Japanese Unexamined Patent Publication (Kokai) 1976-59989, the hydrogenate of the aromatic ring portion of a polymer of a styrene or α-methylstyrene or other vinyl aromatic monomer disclosed in Japanese Unexamined Patent Publication (Kokai) 1988-43910, Japanese Unexamined Patent Publication (Kokai) 1989-1706, etc. may be mentioned.

The molecular weight of the polymeric resin containing an alicyclic structure used in the present invention is suitably selected in accordance with the object of use, but is at least 5000, preferably 5000 to 500000, more preferably 8000 to 200000, particularly preferably 10000 to 100000 in terms of weight average molecular weight (Mw) in a cyclohexane solution (when polymer resin will not dissolve, toluene solution) converted to polyisoprene (converted to styrene in case of toluene solution) measured by gel permeation chromatography, and a molecular weight distribution (Mw/number average molecular weight (Mn)) is 1.0 to 5.0, preferably 1.5 to 4.0, more preferably 1.7 to 3.5, at which time the mechanical strength and moldability are well balanced.

The glass transition temperature (Tg) of the polymeric resin containing an alicyclic structure used in the present invention may be suitably selected in accordance with the object of use, but is preferably high in view of the usage environment and is normally at least 70° C., preferably at least 80° C., more preferably at least 90° C., at which time the heat resistance and the moldability are well balanced.

The melt flow rate (MFR), measured by JIS-K6719 at a temperature of 280° C. and a load of 2.16 kgf, of the polymeric resin containing an alicyclic structure used in the present invention may be suitably selected in accordance with the object of use, but is normally 1 to 300 g/10 min., preferably 5 to 250 g/10 min., more preferably 10 to 200 g/10 min. If the melt flow rate is too low, the temperature for heating the molding material at the time of molding becomes higher, so working becomes difficult in some cases, while if too high, burrs and other molding imperfections sometimes occur when molding or the strength becomes insufficient.

The refraction index of the polymeric resin containing an alicyclic structure used in the present invention measured based on the ASTM-D542 at 25° C. is normally 1.46 to 1.6, preferably 1.5 to 1.56, more preferably 1.52 to 1.56. The higher the refraction index of a resin used in a light guide plate, the closer to the vertical direction an angle of all reflection becomes, consequently, the reflection direction of an incident light on the reflection surface can be made closer to the vertical direction with respect to the light emission surface and higher luminance can be attained.

The water absorbent rate of the polymeric resin containing an alicyclic structure used in the present invention is normally not more than 0.3%, preferably not more than 0.2%, more preferably not more than 0.1%, at which time a fine pattern formed by the above recesses and projections has little possibility of being deformed by absorbing moisture during used as a light guide plate. Thus, the effect of suppressing luminance spots can be maintained for a long period of time.

Note that polymeric resin containing an alicyclic structure may be used alone or in combinations of two or more types.

Other Components

In the polymeric resin containing an alicyclic structure used in the present invention, soft polymers, other polymers, various types of compounding agents, fillers may be mixed in it alone or in combinations of two or more types in accordance with need.

The soft polymer indicates a polymer normally having a glass transition temperature (Tg) of not more than 30° C., and even polymers having several Tgs or polymers having both a TG and a melting point (Tm) are included in the soft polymers as far as the lowest Tg is not more than 30° C.

As such a soft polymer, (a) an olefin-based soft polymer comprised mainly of ethylene, propylene, or another α-olefin, (b) an isobutylene-based soft polymer comprised mainly of isobutylene, (c) a diene-based soft polymer comprised mainly of butadiene, isoprene, or other conjugated diene, (d) a cyclic olefin-based ring-opening polymer comprised mainly of norbornene, cyclopentene, or another cyclic olefin, (e) a soft polymer having a silicon-oxygen bond as a skeleton (organic polysiloxane), (f) a soft polymer comprised mainly of an αβ-unsaturated acid and its derivatives, (g) a soft polymer comprised mainly of an unsaturated alcohol and amine or their acyl derivatives or acetal, (h) a polymer of an epoxy compound, (i) flourine-based rubber, (j) other soft polymers, etc. may be mentioned.

As specific examples of these soft polymers, for example, as (a), liquid polyethylene, atactic polypropylene, 1-butene, 4-methyl-1-butene, 1-hexene, 1-octene, and 1-decene and other homo polymers; ethylene-α-olefin copolymers, propylene-α-olefin copolymers, ethylene-propylene-diene copolymers (EPDM), ethylene-cyclic olefin copolymers, ethylene-propylene-styrene copolymers, and other copolymers may be mentioned; as (b), polyisobutylene, isobutylene-isoprene rubber, isobutylene-styrene copolymers, etc. may be mentioned; as (c), polybutadiene, polyisoprene, and other conjugated diene homo polymers; butadiene-styrene random copolymers, isoprene-styrene random copolymers, acrylonitrile-butadiene copolymers, hydrogenates of acrylonitrile-butadiene copolymers, acrylonitrile-butadiene-styrene copolymers, and other random copolymers of conjugated dienes; butadiene-styrene block copolymers, styrene-butadiene-styrene block copolymers, isoprene-styrene block copolymers, styrene-isoprene-styrene block copolymers, and other block copolymers of conjugated dienes and aromatic vinyl-based hydrocarbons, and hydrogenates of these block copolymers may be mentioned;

as (d), norbornene, vinylnorbornene, ethylidene norbornene, and other norbornene-based monomers or cyclobutene, cyclopentene, cyclooctene, and other metathesis ring-opening polymers of monocyclic olefins and their hydrogenates may be mentioned; as (e), dimethyl polysiloxane, diphenyl polysiloxane, dihydroxypolysiloxane, and other silicone rubbers etc. may be mentioned; as (f), polybutylacrylate, polybutylmethacrylate, polyhydroxy ethylmethacrylate, polyacrylamide, polyacrylonitrile, and other acryl monomer homo polymers; and butylacrylate-styrene copolymers and other copolymers of acryl monomers and other monomers may be mentioned;

as (g), polyvinyl alcohol, polyvinyl acetate, polyvinyl stearate, polyvinyl benzoate, polyvinyl maleate, and other (esterified) unsaturated alcohol homo polymers; vinyl acetate-styrene copolymers and other copolymers of (esterified) unsaturated alcohols and other monomers etc. may be mentioned.

as (h), polyethylene oxide, polypropylene oxide, epichlorohydrin rubber, etc. may be mentioned; as (i), fluovinylidene-based rubber, tetrafluoride ethylene-propylene rubber, etc. may be mentioned. as (j), natural rubber, polypeptides, proteins, polyester-based thermoplastic elastomer, vinyl chloride-based thermoplastic elastomer, polyamide-based thermoplastic elastomer, etc. described in the Japanese Unexamined Patent Publication 1996-73709, etc. may be mentioned.

These soft polymers may have cross-linked structures or may have functional groups introduced by modification.

In the present invention, from the viewpoint of giving moisture-resistance in use of a light guide plate under moisture-resistance environment, the soft polymers of (a), (b), and (c) are preferable among the above soft polymers in that they are particular superior in transparency and dispersability after blending. Among these, a diene-based soft polymer is preferable, and hydrogenates of the diene-based soft polymer wherein carbon-carbon unsaturated bonding in units of co-diene bonding is more preferable. As specific examples of these soft polymers, for example, hydrogenates of polybutadiene and other homo polymers; hydrogenates of butadiene-styrene copolymers and other random copolymers; hydrogenates of butadiene-styrene block copolymers, styrene-butadiene-styrene block copolymers, isoprene-styrene block copolymers, styrene-isoprene-styrene block copolymers and other block copolymers; etc. may be mentioned.

Blending amount of soft polymers in polymeric resin having an alicyclic structure is determined so as to give moisture-resistance in use of a light guide plate under a moisture resistance environment, and the weight percentage of the polymer with respect to 100 wt % of polymeric resin having an alicyclic structure is preferably 0.01 to 5 wt %, more preferable, 0.01 to 1 wt %.

As other polymers, for example, polystyrene, poly(metha) acrylate, polycarbonate, polyester, polyether, polyamide, polyimide, polysulfone, etc. may be mentioned. They may be used alone or in combinations of two or more types. The ratio of combination is suitably selected within the range of the objects of the present invention.

Compounding agents are not particularly limited so long as they are ones in general use in the plastic industry, but for example, antioxidants; UV absorbents; light stabilizer; near infrared absorbents; dyes, pigments and other coloring agents; smoother; plasticizers; antistatic agents; fluorescent brightening agents; etc. may be mentioned.

As antioxidants, phenol-based, phosphorus-based, sulfate-based antioxidants, etc. may be mentioned, but among these, phenol-based antioxidant is preferable and alkyl exchange/substitution phenol-based antioxidant is particularly preferable.

As phenol-based antioxidants, those which have been well known may be used, for example, acrylate-based compounds described for example in Japanese Unexamined Patent Publication 1988-179953 and Japanese Unexamined Patent Publication 1989-168643, such as 2-t-butyl-6-(3-t-butyl-2-hydroxy-5-methyl benzyl)-4-methylphenyl acrylate, 2,4-di-t-amyl-6-(1-(3,5-di-t-amyl-2-hydroxyphenyl)ethyl) phenilacrylate; alkyl exchange/substitution phenol-based compounds, such as, octadecyl-3-(3,5-di-t-butyl-4-hydroxyphenyl)propionate, 2,2'-methylene-bis(4-methyl-6-t-butylphenol), 1,1,3-tris(2-methyl-4-hydroxy-5-t-butylphenyl)butane, 1,3,5-trimethyl-2,4,6-tris(3,5-di-t-butyl-4-hydroxy benzyl)benzene, tetrakis(methylene-3-(3', 5'-di-t-butyl-4'-hydroxyphenyl propionate)methane [namely, pentaerythrimethyl-tetrakis(3-(3,5-di-t-butyl-4-hydroxyphenyl propionate)], triethyleneglycol bis(3-(3-t-butyl-4-hydroxy-5-methylphenyl)propionate), etc.; triazine group contained phenol-based compounds, such as 6-(4-hydroxy-3,5-di-t-butylanilino)-2,4-bisoctylthio-1,3,5-triazine, 4-bisoctylthio-1,3,5-triadin, 2-octylthio-4,6-bis-(3, 5-di-t-butyl-4-oxyanilino)-1,3,5-triazine, etc. may be mentioned.

Phosphorus-based antioxidants are not particularly limited so long as they are ones in general use in the plastic industry, but for example, monophosphate-based compounds, such as triphenylphosphate, diphenylisodecyl phosphate, phenyldiisodecyl phosphate, tris(nonylphenyl) phosphate, tris(dinonylphenyl)phosphate, tris(2,4-di-t-butylphenyl)phosphate, 10-(3,5-di-t-butyl-4-hydroxy benzyl)-9,10-dihydro-9-oxa-10-phosphaphenanthrene-10-oxide; diphosphate-based compounds, such as 4,4'-butylidene-bis(3-methyl-6-t-butylphenyl-di-tridecylphosphate), 4,4' isopropylidene-bis(phenyl-di-alkyl ($C_{12}$ to $C_{15}$)phosphate), etc. may be mentioned. Among these, monophosphate-based compounds are preferable and tris(nonylphenyl)phosphate, tris(dinonylphenyl)phosphate, tris(2,4-di-t-butylphenyl)phosphate, etc. are particularly preferable.

As sulfate-based antioxidants, for example, dilauryl 3,3-thiodipropionate, dimyristyl 3,3'-thiodipropipionate, distearyl 3,3-thiodipropionate, laurylstearyl 3,3-thiodipropionate, pentaerythritol-tetrakis-(β-lauryl-thiopropionate), 3,9-bis(2-dodecylthioethyl)-2,4,8,10-tetraoxaspiro[5,5]undecan, etc. may be mentioned.

These antioxidants may be used alone or in combinations of two or more types. The ratio of combination is suitably selected within the range of not interfering with the objects of the present invention, but is normally 0.001 to 5 wt %, preferably 0.01 to 1 wt % with respect to 100 wt % of a polymeric resin having an alicyclic structure.

As UV absorbents, for example, 2-(2-hydroxy-5-methylphenyl)2H-benzotriazole, 2-(3-t-butyl-2-hydroxy-5-methylphenyl)-5-chloro-2H-benzotriazole, 2-(3,5-di-t-butyl-2-hydroxyphenyl)-5-chloro-2H-benzotriazole, 2-(3,5-di-t-butyl-2-hydroxyphenyl)-2H-benzotriazole, 5-chloro-2-(3,5-di-t-butyl-2-hydroxyphenyl)-2H-benzotriazole, 2-(3,5-di-t-amyl-2-hydroxyphenyl)-2H-benzotriazole, and other benzotriazole-based UV absorbents; 4-t-butylphenyl-2-hydroxybenzoate, phenyl-2-hydroxybenzoate, 2,4-di-t-butylphenyl-3,5-di-t-butyl-4-hydroxybenzoate, hexadecyl-3,5-di-t-butyl-4-hydroxybenzoate, 2-(2H-benzotriazol-2-yl)-4-methyl-6-(3,4,5,6-tetrahydrophthalimidylmethyl) phenol, 2-(2-hydroxy-5-t-octylphenyl)-2H-benzotriazole, 2-(2-hydroxy-4-octylphenyl)-2H-benzotriazole, and other benzoate-based UV absorbents; 2,4-dihydroxybenzophenone, 2-hydroxy-4-methoxybenzophenone, 2-hydroxy-4-methoxybenzophenon-5-sulfonate trihydrate, 2-hydroxy-4-octyloxy-benzophenone, 4-dodecyloxy-2-hydroxybenzophenone, 4-benzyloxy-2-hydroxybenzophenone, 2,2',4,4'-tetrahydroxylbenzophenone, 2,2'-dihydroxy-4,41-dimethoxybenzophenone, and other benzophenone-based UV absorbents; ethyl-2-cyano-3,3-diphenylacrylate, 2'-ethylhexyl-2-cyano-3,3-diphenylacrylate, and other acrylate-based UV absorbents; [2,2'-thiobis(4-t-octylphenolate)]-2-ethylhexylamine nickel and other metal inert complex-based UV absorbents etc. may be mentioned.

As light stabilizers, for example, 2,2,6,6-tetramethyl-4-piperidyl benzoate, bis(2,2,6,6-tetramethyl-4-piperidyl) sebacate, bis(1,2,2,6,6-pentamethyl-4-piperidyl)-2-(3,5-di-t-butyl-4-hydroxy benzyl)-2-n-butylmaronate, 4-(3-(3,5-di-t-butyl-4-hydroxyphenyl)propionyloxy)-1-(2-(3-(3,5-di-t-butyl-4-hydroxyphenyl)propionyloxy)ethyl)-2,2,6,6-tetramethylpiperidine, and other hindered amine-based light stabilizers may be mentioned.

As near infrared absorbents, for example, cyanine-based near infrared absorbents; pyrylium-based near infrared absorbents; squaririum-based near infrared absorbents; clochonium-based near infrared absorbents; azulenium-based near infrared absorbents; phthalocyanine-based near infrared absorbents; dithiol metal inert complex-based near infrared absorbents; naphthoquinone-based near infrared absorbents; anthraquinone-based near infrared absorbents; indophenol-based near infrared absorbents; azide-based near infrared absorbents, etc. may be mentioned. Also, near infrared absorbents on the market, such as SIR-103, SIR-114, SIR-128, SIR-130, SIR-132, SIR-152, SIR-159 and SIR-162 (produced by Mitsui Toatsu Chemicals), Kayasorb IR-750, Kayasorb IRG-002, Kayasorb IRG003, IR820B, Kayasorb IRG-022, Kayasorb IRG-023, Kayasorb CY-2, Kayasorb CY-4, Kayasorb CY-9 (produced by Nipppon Kayaku Co.,Ltd.), etc. may be mentioned.

The dye is not particularly limited so long as it uniformly disperses and dissolves in a polymer components, but wide use is made of an oil-soluble dye (various C.I solvent dyes). As specific examples of the oil soluble dues, mention may be made of the various types of C.I. solvent dyes listed in the Color Index, vol. 3, published by the Society of Diyes and Colourists. As the pigment, for example, Pigment Red 38 and other diarylide-based pigments; Pigment Red 48:2, Pigment Red 53, Pigment Red 57:1, and other azo lake-based pigments; Pigment Red 144, Pigment Red 166, Pigment Red 220, Pigment Red 221, Pigment Red 248, and other condensation azo-based pigments; Pigment Red 171, Pigment Red 175, Pigment Red 176, Pigment Red 185, Pigment Red 208, and other benzimidazolone-based pigments; Pigment Red 122 and other quinacridone-based pigments; Pigment Red 149, Pigment Red 178, Pigment Red 179, and other perillene-based pigments; and Pigment Red 177 and other anthraquinone-based pigments may be mentioned. Note that when a light guide plate is required to be colored, either dyes or pigments may be used within the range of the objects of the present invention and is not limited, but in the case of a light guide plate wherein micro-scale optical characteristics matters, coloring by dyes is D preferable. Also, UV absorbents sometimes looks yellow to red color visually and near infrared absorbents sometimes looks black color visually, thus, it is unnecessary to strictly distinguishing these dyes and they may be combined for using.

As smoothing agents, organic compounds, such as esters of aliphatic alcohols and esters of polyhydric alcohol, or partial ester; or inorganic fine particles, etc. may be used. As organic compounds, for example, glyceryl monostearate, glyceryl monolaurate, glyceryl distearate, pentaerythritol monostearate, pentaerythritol distearate, pentaerythritol tristearate, etc. may be mentioned. As other smoothing agents, inorganic particles may be generally used. Here, as inorganic fine particles, oxides of 1, 2, 4 and 6 to 14 families of elements in the periodic table, sulfide, hydroxide, nitrogenous substance, haloid, carbonate, hydrosulfate, acetate, phosphate, phosphonate, organic carboxylate, fluosilicate, titanate, fluoboric acid, and particles of their hydrated compounds, complex compound mainly contained by them, natural compounds, etc. may be mentioned.

As plasticizers, for example, phosphate triester-based plasticizers, such as, tricredil phosphate, trixylylphosphate, triphenylphosphate, triethylphenylphosphate, diphenylcredil phosphate, monophenylcredil phosphate, diphenylmonoxylenolphosphate, monophenyldixylenolphosphate, tributylphosphate, triethylphosphate; phthalate plasticizers, such as, dimethyl phthalate, dibutyl phthalate, diheptyl phthalate, phthalic di-n-octyl, phthalic di-2-ethylhexyl, phthalic diisononyl, octyldecyl phthalate, phthalic butyl benzyl; fatty acid monobasic acid ester-based plasticizers, such as, olein acid butyl, glyceryl monoolein acid ester; dihydric alcohol ester-based plasticizers; oxyacid ester-based plasticizers, etc. may be used. Among them, phosphate triester-based plasticizer is preferable and tricredil phosphate, trixylylphosphate are particularly preferable. Furthermore, hydrocarbon polymer being liquid at normal temperature or liquid low molecular weight hydrocarbon are preferably used as a plasticizer. Among them, liquid hydrocarbon polymer of a straight chain state or branch chain state not having a hydrocarbon ring in the main chain is preferable. The weight average molecular weight of the liquid hydrocarbon polymer or liquid low molecular weight hydrocarbon is preferably not more than 10000, more preferably between 200 and 8000, particularly preferably between 300 and 4000. As specific examples of the liquid hydrocarbon polymer, polyisobutene, hydrogenated polybutadiene, hydrogenated polyisoprene, etc. are mentioned. As specific examples of the liquid low molecular weight hydrocarbon, squalane ($C_{30}H_{62}$, molecular weight=422.8), fluid paraffin (white oil regulated by JIS-K2231 ISO VG10, ISO VG15, ISO VG32, ISO VG68, ISO VG100, VG8 and VG21, etc.) may be mentioned. Among them, squalene, fluid paraffin, polyisobutene are preferable.

As antistatic agents, fatty acid esters of long-chain alkyl alcohol, such as stearyl alcohol, biphenyl alcohol; and polyhydric alcohol, such as glyceryl mono stearate, pentaerythritor monostearate; etc. may be mentioned, but stearyl alcohol and biphenyl alcohol are particularly preferable.

These compounding agents may be used alone or in combinations of two or more types. The ratio of combination is suitably selected within the range of not interfering with the objects of the present invention, but is normally 0.001 to 5 wt %, preferably 0.01 to 1 wt % with respect to 100 wt % of a polymeric resin having an alicyclic structure.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Figure 1:
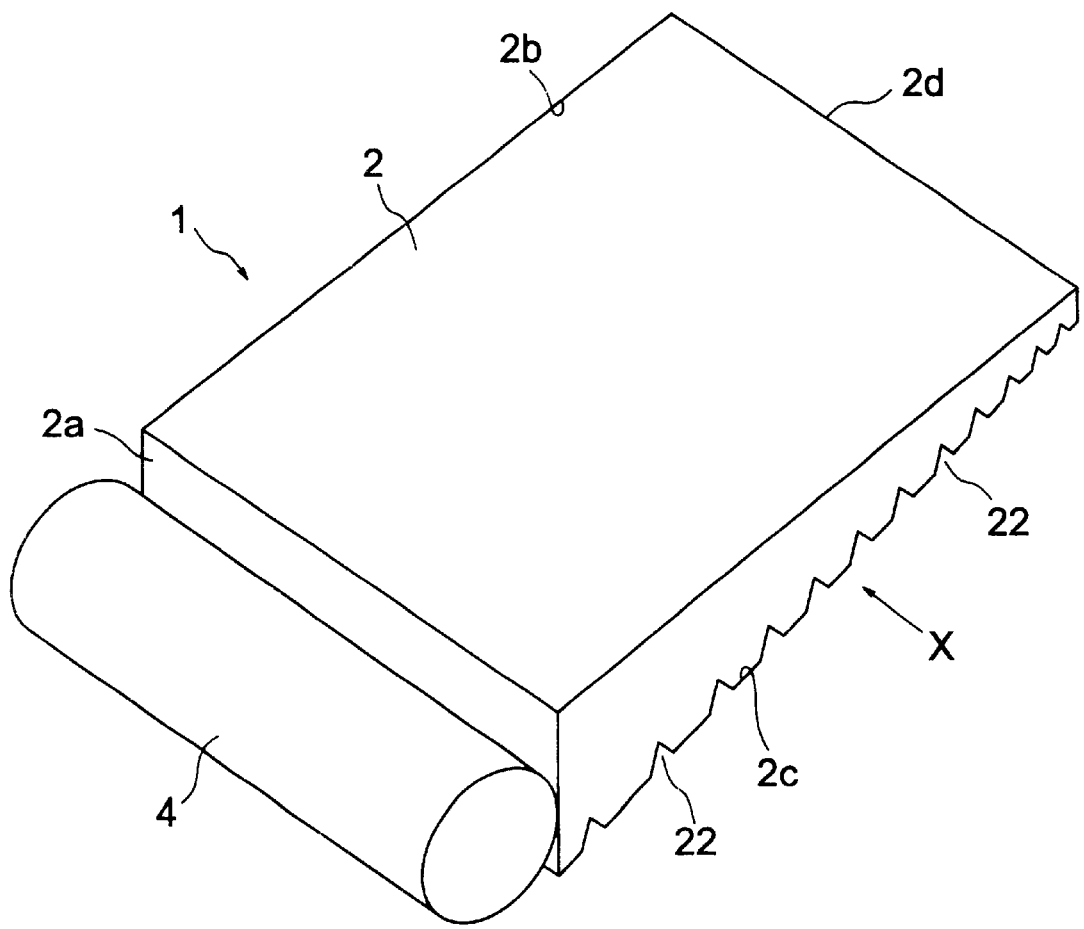
FIG. 1 is a view of a use form of a light guide plate according to a first embodiment of the present invention.

Below, embodiments of the present invention will be explained based on the drawings, but the embodiments are described for easier understanding of the present invention and not for limiting the present invention.

First Embodiment

In the present embodiment, a case will be explained where a light guide plate of the present invention is used in an edge light mode plane light source apparatus for a variety of display devices. A plane light source apparatus 1 comprises, as shown in FIG. 1, a light guide plate 2 and a light source 4 arranged on at least one side of the light guide plate 2.

As the light source 4, a fluorescent light of a cold cathode tube and of hot cathode tube may be mentioned, and particularly the cold cathode tube is preferably used for its low power consumption. For attaining high luminance and thin style, the light source 4 also preferably has a thin tube diameter and high luminance, more preferably the tube diameter is 6 to 2 mm and a tube surface luminance is at least 15000 $cd/m^2$. Furthermore, since a color temperature (expressing the color of the light source 4 by a temperature (° K.: Kelvin)) affects a visible light emitted from the emission surface 2b of the light guide plate 2, a light source of emitting a light from the emission surface 2b having a color temperature of about 7000 to 8000° K., preferably 7400 to 7500° K. is used. Note that other than the above parts, while not illustrated, a lamp reflector arranged surrounding the light source 4 for effectively guiding a light from the light source which did not directly incident to the light incident surface 2a of the light guide plate 2 and a reflection sheet arranged on the light reflection surface 2c of the light guide plate 2 for giving back the light leaked from the light guide plate 2 again to the light guide plate 2 are also components of the plane light source apparatus 1 in the present embodiment. Also, in accordance with desire, a light convergence sheet and/or a light diffusion sheet may be arranged above the light emission surface 2b.

The configuration of the light guide plate 2 of the present embodiment will be explained next.

Figure 2:
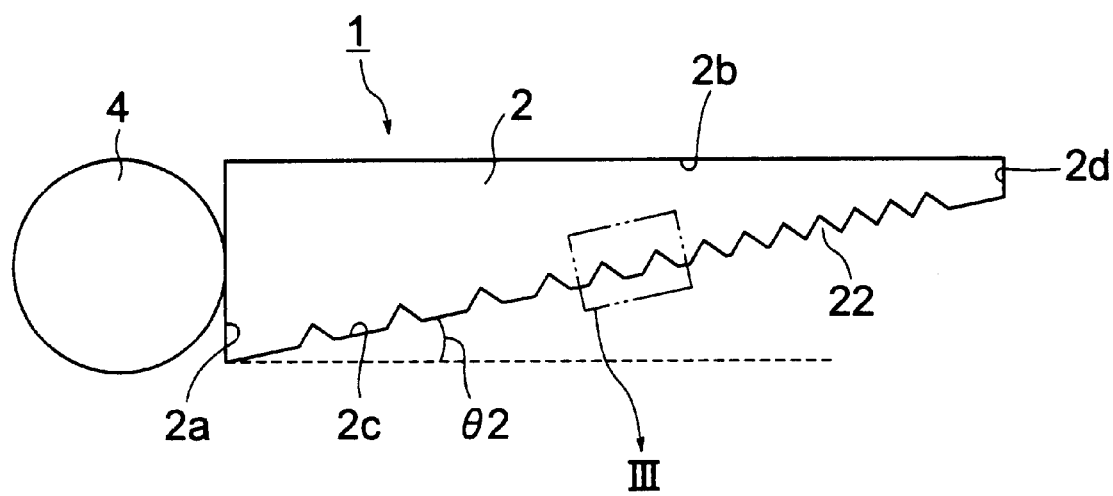
FIG. 2 is a sectional view seen from the X-direction in FIG. 1.

The light guide plate 2 is, as shown in FIGS. 1 and 2, a member for emitting from the light emission surface 2b a light of the light source 4 incident from the light incident surface 2a while guiding the light to be in the longitudinal direction without any luminance spots, and is comprised of a polymeric resin having an alicyclic structure (other components of which is compounded in accordance with need).

Also, the light guide plate 2 is wedge shaped, wherein the thickness becomes gradually thinner as the section becomes away from the light source 4 side (in an approximately perpendicular direction with respect to an axis center of a straight line shaped light source). By being a wedge shape, it is possible to attain a high luminance due to an effective use of the light and light weight of the light guide plate itself. In this case, the thickness of the light guide plate on the light incident surface 2a side of the light guide plate 2 is normally 0.5 to 10 mm, preferably 1 to 5 mm, and the thickness of the facing surface 2d side is normally 0.1 to 5 mm, preferably 0.1 to 1 mm. The area ratio of the light incident surface 2a and the light emission surface 2b is, based on the former/the latter, 1/5 to 1/500, preferably 1/10 to 1/400, more preferably 1/15 to 1/300.

The length of the light guide plate 2 in the approximate parallel direction with respect to the axis center of the light source 4 is normally 20 to 400 mm, preferably 40 to 350 mm, and the length in the approximately vertical direction with respect to the axis center of the light source 4 is normally 20 to 400 mm, preferably 40 to 350 mm.

Furthermore, the light guide plate 2 has narrow and long V-shaped grooves 22 in the approximately vertical direction with respect to the direction being away from the light source 4 side (the approximately parallel direction with respect to the axis center of the straight line shaped light source) for uniformly emitting the light introduced from the light source 4.

By adopting the V-shaped grooves as recess portions of the present invention, an angle can be set so that the light emitted from the light emission surface 2b of the light guide plate 2 can be emitted in the direction closer to the vertical direction, and furthermore, the effects becomes more remarkable with the groove shape than a dot shape so higher luminance of the light emission surface can be attained easier.

Such V-shaped grooves 22 are formed to be gradually denser or deeper from the light source 4 side of the light guide plate 2 to an end portion thereof. Namely, they are not always have to be formed to be gradually denser from the light source 4 side of the light guide plate 2 to the end portion, and may be formed at regular intervals but that the V-shaped grooves 22 become deeper.

Figure 3:
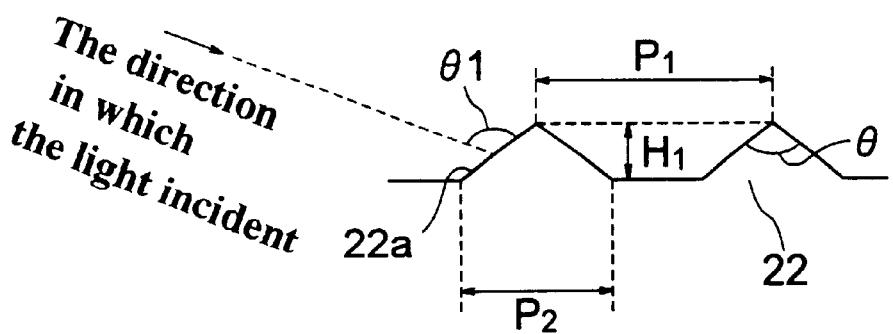
FIG. 3 is an enlarged view of the III portion in FIG. 2.

As shown in FIG. 3, when forming to be gradually denser from the light source 4 side of the light guide plate 2 to the end portion, a pitch $P_1$ between the adjacent grooves 22 and 22 is normally 50 to 10000 µm, preferably 100 to 5000 µm, more preferably 500 to 2000 µm at an end portion close to the light source, while at the opposite end portion, the pitch is normally 10 to 1000 µm, preferably 30 to 500 µm, more preferably 50 to 100 µm.

Also, the ratio of the pitch $P_1$ between the adjacent V-shaped grooves 22 and 22 on the light incident surface 2a side of the light guide plate 2 and the P1 on the facing surface 2d side is normally 30/1 to 2/1, preferably 20/1 to 2/1, more preferably 10/1 to 3/1. As a result that the pitch of the V-shaped grooves 22 is set in such a range, the light incident from the light source can be reflected and emitted so that the light amount becomes uniformed at any part on the light emission surface, and thus a light guide plate which brings a little luminance spots can be obtained.

Also, a width $P_2$ of the V-shaped grooves 22 is normally 10 to 5000 µm, preferably 30 to 2000 µm, more preferably 50 to 1000 µm.

Note that the shape of the V-shaped groove is not necessarily perfect V-shape formed by perfect planes and may be an approximate V-shape as far as the effects of the present invention can be attained. The apex angle is indicated as θ in a perfect V-shape, while in the approximate V-shape, the V-shaped groove is enlarged to be about 500 to 1000 times for observing, a triangle is assumed by connecting two points on the left and right of the V-shaped groove, where a start of caving from the light reflection surface can be clearly confirmed at the naked eye level, and one point at the deepest portion of the groove (at the center point when the deepest portion is flat), and a groove angle formed at the deepest portion is considered to be the apex angle θ. The angle of θ is preferably 70 to 150°, more preferably 90 to 130°, particularly preferably 100 to 120°.

A depth $H_1$ of the V-shaped grooves 22 is preferably 1 to 1000 µm, more preferably 5 to 500 µm, further preferably 10 to 100 µm, particularly preferably 30 to 80 µm. When the shape of the V-shaped groove is in the range, the incident light can be preferably reflected and emitted from the light emission surface, and higher luminance of the light guide plate can be attained more preferably.

The length of two groove planes forming a perfect V-shaped groove and an approximate V-shaped groove may be either same or different. These lengths may be suitably set based on the value of the suitable groove depth of the preferable apex angle of the groove as above.

An angle θ1 formed by a plane 22a on the light source side composing the above V-shaped groove 22 and the direction in which the light incident is normally more than 90° and not more than 170°, preferably 120 to 165°, more preferably 140 to 160°. When the θ1 formed by the groove plane on the light source side and the light incident direction is particularly in the range, the incident light is emitted from the light emission surface of the light guide plate by the reflection of almost total reflection due to the V-shaped grooves, so that it is preferable for attaining higher luminance of the light guide plate.

The V-shaped grooves 22 explained above may be formed at least on the light reflection surface 2c or also on the both surfaces (on the light reflection surface 2c and the light emission surface 2b) of the light guide plate 2. If they are formed al least on the light reflection surface 2c, the reflection efficiency of the light introduced to the light guide plate and the light convergence efficiency to the vertical direction with respect to the light incident direction are improved and the object of the present invention can be attained.

The light guide plate 2 having such V-shaped grooves 22 is molded as one body by an injection molding.

Note that the inclination angle θ2 (see FIG. 2) of the light reflection surface 2c of the light guide plate 2 is normally 0.1 to 15°, preferably 0.2 to 10°. By designing the wedge-shaped light guide plate 2 in the range, the thinness of the light guide plate itself and higher luminance by effective use of a light are preferably balanced. Also, to use both of the preferable range of the above angle θ1 and that of the angle θ2 is preferable for forming a light reflection pattern for particularly attaining higher luminance.

Since the light guide plate of the present invention is comprised of polymeric resin having an alicyclic structure being also superior in mechanical strength, the mechanical strength of a light guide plate to be obtained can be made strong. Particularly, the mechanical strength of the light guide plate 2 after being formed the V-shaped grooves 22 can be made strong, so there is a little possibility that inconveniences of causing breaking, cracks, etc. at its end portions at the time of taking out the molded light guide plate from the mold.

Next, an example of a method of production of the above light guide plate 2 will be explained.

The light guide plate 2 of the present embodiment can be obtained by molding a molding material wherein the above other compounds are blended into a polymeric resin having an alicyclic structure in accordance with need. A method of blending the other compounds is not particularly limited so long as it is a method which sufficiently disperses these compounding agents in the polymeric resin containing alicyclic structure. For example, there are a method of kneading the resin in a molten state by a mixer, twin-screw mixer, roll, Brabender, extruder, etc., a method of dissolving the resin in a suitable solvent to disperse it, then removing the solvent by coagulating method, a casting method, or a direct drying method, etc. When using a twin-screw mixer, after kneading, usually the resin is extruded in a molten state into rods and the rods are cut into suitable lengths by a strand cutter to form pellets.

As a molding method, molten molding by using the above molding material is preferable, and as the molten molding, heat press molding and injection molding may be mentioned, but particularly the injection molding is preferable in terms of moldability and productivity.

Below, a case of molding a light guide plate 2 by using a screw injection molding machine comprising a hopper, a heat cylinder, a screw and a mold will be explained as an example.

First, when the molding material is put into the hopper of the molding machine, the pellets drop into the heat cylinder by their own weight, touch the screw, and are gradually sent to the end portion of the heat cylinder by rotation thereof. Here, the temperature of the heat cylinder (corresponding to a resin temperature) is controlled to be normally 100 to 400° C., preferably 230 to 360° C., more preferably 260 to 340° C. When the resin temperature is excessively low, the fluidity declines and surface sink or distortion arises in a molded piece, while when the resin temperature is excessively high, there is a possibility of arising molding deficiencies, such that silver streaks arise due to heat decomposition of the resin or that the molded piece becomes yellowish. The control of the temperature of the heat cylinder (resin temperature) is performed for example by a jacket, heater, etc. The rotation rate of the screw is suitably determined so that the molding material is uniformly mixed. Note that for the purpose of reducing the molding deficiencies as much as possible, the molding material is primarily dried in advance before putting into the hopper for not more than 6 hours, preferably not more than 4 hours, more preferably not more than 2 hours.

Next, the molding material being plasticized to be molten in the above way is kept by a predetermined amount at the end portion of the screw, and the screw is receded in the heat cylinder for a predetermined distance to be away from a nozzle at the end portion of the heat cylinder as the plasticizing process proceeds. At this time, it is preferable to apply a back pressure of 20 to 150 kgf/cm$^2$ in the direction of suppressing the receding move of the screw on the injection cylinder side. By applying the back pressure in the range, the effects of plasticizing and mixing of the molding material can be heightened and an appearance of bubbles and silver streaks in the molded piece can be prevented. By receding the screw by a predetermined distance in the heat cylinder, a predetermined amount of the molding material is kept near the nozzle at the end of the cylinder, which is an injection amount of the molding material to be injected in the mold. The injection amount is not specifically limited in relation with a size, thickness, etc. of the light guide plate. The control of the receding distance is performed by a microswitch, etc.

Figure 4:
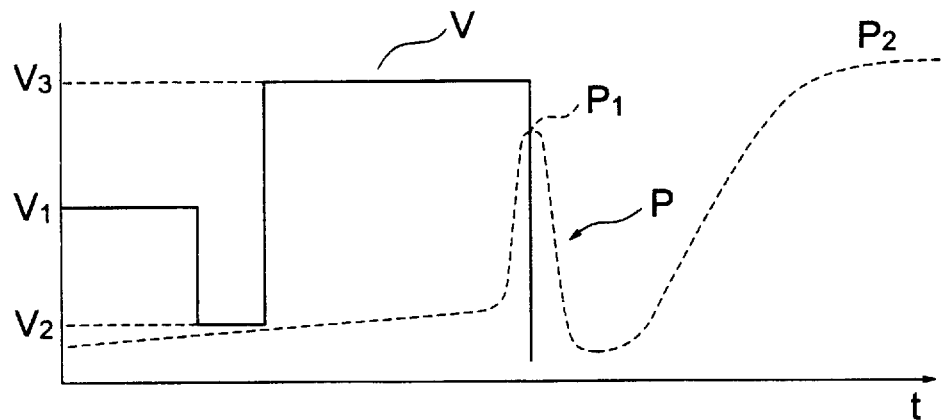
FIG. 4 is a graph wherein changes over time of emission speed and dwelling pressure application in an injection molding in the present embodiment is expressed by the relationship with time.

Next, the screw is proceeded toward the nozzle in the heat cylinder at a predetermined speed by an injection cylinder in order to fill the mold with the plasticized molten molding material kept near the nozzle through the nozzle. The injection speed at this time is not specifically limited, but it is preferable to change in three stages as shown in FIG. 4 (wherein the vertical axis indicates the proceeding speed V of the screw or an injection pressure P and the horizontal axis indicates time). Namely, the screw is proceeded toward the nozzle at a predetermined speed $V_1$ shown in FIG. 4 at first to press the molding material in the sprue and runner of the mold, then the proceeding speed of the screw is made slow down to be the speed $V_2$ when it starts to pass near a gate of the mold, and after that, the speed is set to be the speed $V_3$ which is faster than the speed $V_1$ The speed $V_3$ corresponds to the injection speed. Specifically, the injection speed corresponding to the proceeding speed $V_3$ of the screw in FIG. 4 is preferably made to be 20 to 100 cm$^3$/sec. When the injection speed is less than 20 cm$^3$/sec., it is liable that the transferability of the V-shaped grooves 22 declines, it becomes difficult to mold a relatively large screen size (10 inches or more) of a light guide plate at a high plane accuracy, and luminance spots may be caused thereby. On the other hand, the upper limit of the injection speed is preferably determined in the range that the fluidity of the molding material can be controlled, but if the injection speed is too fast, the temperature of the molding material abruptly rises due to a shearing force, which possibly results in causing silver streaks on the molded piece.

A pressure (injection pressure) to be applied on the molding material at the time of injecting the molding material by proceeding the screw to the nozzle side can be suitably determined mainly by viscosity characteristics (fluidity) of the molding material, a shape and thickness of the molded piece or a structure of the mold, and is normally 500 to 1500 kgf/cm$^2$. The injection pressure can be divided to two stages; a stage of injecting the molding material in the mold (hereinafter, also referred to as an injection pressure) and a stage after filling the mold (hereinafter, also referred to as a dwell pressure application). In the molding method according to the present embodiment, changes of the injection pressure indicated by a dotted line P in FIG. 4 is exhibited as a result of controlling the proceeding speed V of the screw shown in FIG. 4.

As shown in FIG. 4, the injection pressure P gradually rises while filling the molding material in the mold, abruptly rises or falls at the time of completion of filling to the mold to display a peak pressure p$^1$. A pressure p$^2$ applied to the mold thereafter is the dwell pressure.

The dwell pressure is a pressure which is applied for a certain period of time after the mold is approximately filled by the injection pressure until the gate portion of the mold is completely cooled to be set. The upper limit value of the dwell pressure application is generally set in the range of a mold clamping force of the mold, and is normally 2000 kgf/cm$^2$, preferably 1700 kgf/cm$^2$, more preferably 1500 kgf/cm². By setting the upper limit of the dwell pressure application, possibility of arising molding deficiencies like warps in the molded piece can be removed. The lower limit value of the dwell pressure application is at least 100 kgf/cm², preferably 120 kgf/cm², more preferably 150 kgf/cm². By setting the lower limit in the range, the transferability of the V-shaped grooves 22 is not deteriorated, surface sink can be prevented in the light guide plate as the molded piece, the reduction rate by molding can be made small, and a light guide plate having an excellent size accuracy can be obtained.

The peak pressure $P_1$ is not specifically limited, but preferably 95 to 15% of the dwell pressure application $P_2$, more preferably 90 to 40%, further preferably 80 to 60%. By setting the peak pressure P1 to be in the preferable range of 95 to 15% of the dwell pressure application $P_2$, deficiencies in filling to the mold can be prevented, the transferability of the V-shaped grooves 22 can be improved, a density of the light guide plate as the molded piece can become high, and the molding reduction rate can be suppressed low, thus, a highly accurate light guide plate can be obtained. Also, excessive occurrence of burs on the molded piece can be prevented, occurrence of deformation caused by leaving an excessive internal stress on the molded piece can be prevented, difficulty in releasing from the mold caused by excessive filling to the mold can be prevented, and damaging on the mold can be prevented.

The nozzle diameter of the injection molding machine is determined so as not to cause heat decomposition of the molding material, but since a polymeric resin having an alicyclic structure is used as the molding material in the present embodiment, the nozzle diameter can be made smaller comparing with that in the related art.

Figure 5:
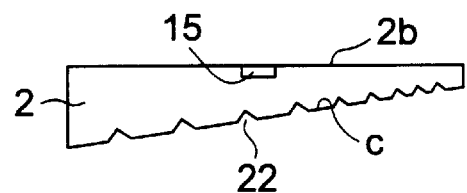
FIG. 5 is a sectional view of a light guide plate produced by the injection molding.
Figure 6:
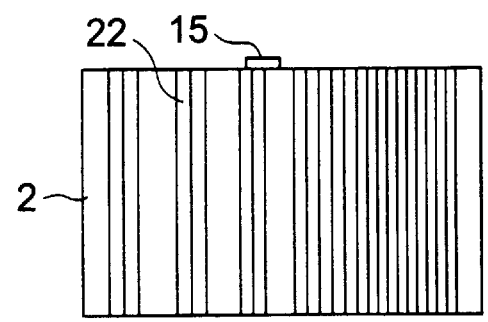
FIG. 6 is a view of a bottom surface in FIG. 5.

Note that as show in FIGS. 5 and 6, the injection molding is preferably performed so that a mark 15 equivalent to the gate is left on the light emission surface 2b side near the approximate center of the light guide plate 2 in the present embodiment. By injecting the molding material from this portion, fluidity characteristics of the material in the mold is improved, the gate mark 15 does not persist on the light reflection surface 2c, and luminance spots are hard to occur, thus it is convenient.

Next, the molding material filled in the mold is kept in the mold for a certain period of time and cooled to be set.

The mold temperature is normally set to be a lower temperature than a Tg of the polymeric resin having an alicyclic structure to be used, preferably set in the range of (Tg-80) to (TG-10)° C. of the resin, more preferably (Tg-60) to (Tg-20)° C. Generally, in terms of molding efficiency, the lower the mold temperature is, the more preferable for faster completion of cooling and for an easier release of the molded piece from the mold (releasability), but if it is too low, the fluidity of the resin in the mold is deteriorated which causes molding deficiencies. On the other hand, in terms of moldability, the higher the mold temperature is, the preferable for improving the fluidity of the molding material, but if it is made too high to over the Tg of the molding material, it is not preferable because release of a light guide plate as the molded piece from the mold becomes difficult, and a plane accuracy of the molded piece can not be obtained. Also, when the mold temperature is low, surface sink and bubbles are caused, the molding reduction rate becomes large, and a highly accurate molded piece cannot be obtained. By setting the mold temperature in the range, the molding efficiency and the moldability can be well balanced.

The mold clamping pressure of the mold is preferably 100 to 2000 kgf/cm², more preferably 500 to 1900 kgf/cm², further preferably 1000 to 1800 kgf/cm². By setting the mold clamping pressure of the mold in the range, inconvenience such that the mold opens by the pressure applied on the mold at the time of filling the molding material to the mold can be prevented, which contributes to an improve of the molding efficiency.

The cooling time can be suitably changed in accordance with a resin temperature, a mold temperature, thickness of a molded piece, etc. When the cooling time is set long, deformation of the molded piece can be decreased, but a cycle time becomes long and the removal of the molded piece from the mold becomes difficult. On the other hand, when the cooling time is set short, set of the molded piece becomes insufficient, which leads to deformation of the molded piece and decline of size stability. Accordingly, it is necessary to determine the most suited cooling time in consideration of the above, and it is normally 1 to 15 minutes.

After cooling for a certain period of time in the mold in the above way, the mold is opened, the molded piece is taken out, and one cycle of the molding processing completes. Such a cycle may be performed either by a manual operation or an automatic operation.

Second Embodiment

Figure 7:
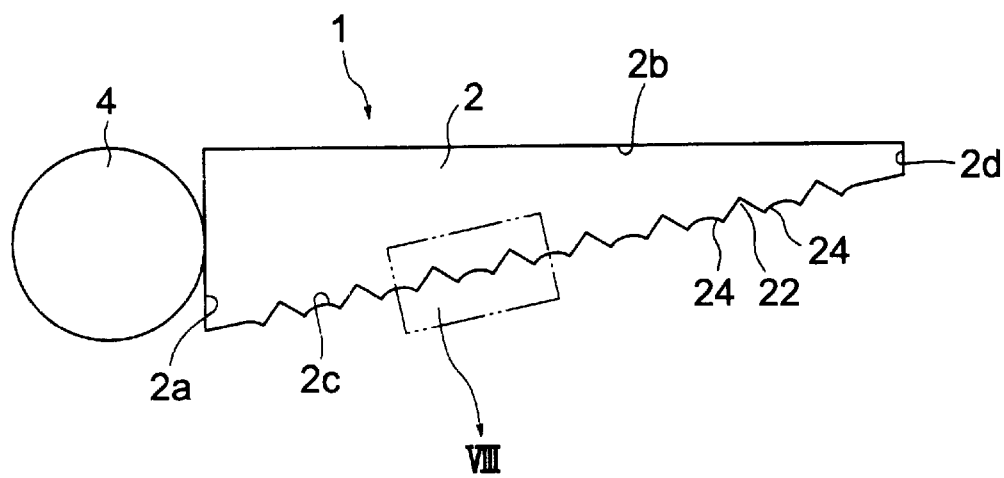
FIG. 7 is a view of a use form of a light guide plate according to a second embodiment of the present invention and is a sectional view seen from the X-direction in FIG. 1.
Figure 8:
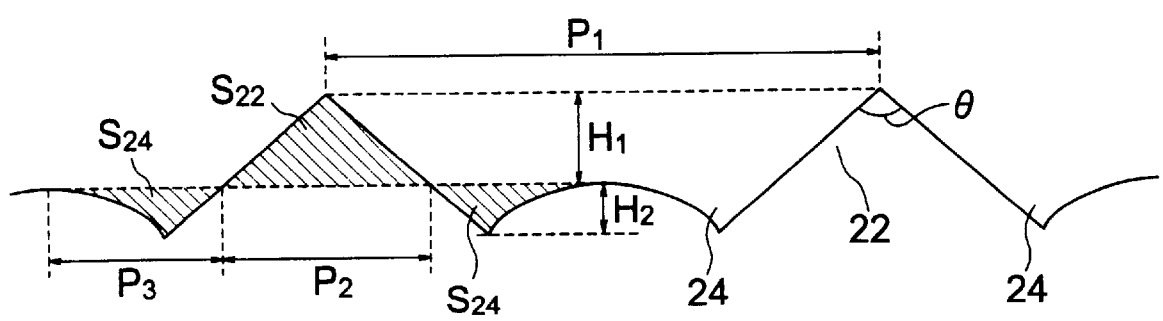
FIG. 8 is an enlarged view of the VIII portion in FIG. 7.

The present embodiment is, as shown in FIGS. 7 and 8, different from the first embodiment in the point that protrude portions 24 and 24 as projections are further provided near the both edges of the V-shaped groove 22 as a recess, and other points are the same with those in the first embodiment. The light introduced into the light guide plate 2 configured as such is partially reflected on the planes of the V-shaped grooves 22 as recesses and emitted from the light reflection surface 2c, while a part of the light incident to the protrude portions 24 as projections formed near the edges of the respective recesses is made full reflection but most of it is refracted and emitted from the bottom surface (light reflection surface 2c) of the light guide plate to an external direction and preferably reflected at random on the reflection sheet (not shown), returns to the light guide plate 2 again and emitted from the light emission surface. Accordingly, when seeing a position being formed shapes of the recesses and projections provided on the light reflection surface 2c from the light emission surface of the light guide plate, the recesses and projections formed near edges thereof do not look shining, and the shapes become blurred and almost impossible to see. Also, the protrude portions 24 and 24 as projections are formed near the both edges of the V-shaped groove as a recess, an inferiority in the luminance spots can be further prevented comparing with the case where only one edge is provided with the protrude portion 24.

Such V-shaped grooves 22 are formed to be gradually denser or deeper from the light source 4 side of the light guide plate 2 to an end portion thereof. Namely, they are not always have to be formed to be gradually denser from the light source 4 side of the light guide plate 2 to the end portion, and may be formed at regular intervals but that the V-shaped grooves 22 becomes deeper.

As shown in FIG. 8, the height $H_2$ of the protrude portions 24 and 24 formed near the both edges of the above V-shaped grooves 22 is 10 to 15 $\mu$m, preferably 20 to 120 $\mu$m, more preferably 25 to 100 $\mu$m. The height of the protrude portions 24 and 24 with respect to the depth $H_1$ of the above V-shaped grooves 22 is 10 to 500%, preferably 20 to 300%, more preferably 30 to 200%. A width $P_3$ of the protrude portions 24 is 10 to 1000 $\mu$m, preferably 50 to 600 $\mu$m, more preferably 100 to 400 $\mu$m.

The ratio of a cross sectional area $S_{22}$ of the above V-shaped groove (an amount of one $S_{22}$) and a cross sectional area $S_{24}$ of the protrude portion 24 (an amount of one $S_{24}$) formed near the both edges of the V-shaped grooves 22 is preferably 10:1 to 10:100, more preferably 10:2 to 10:50, particularly preferably 10:5 to 10:20. By setting the ratio of the cross sectional areas in this range, further improvement of the reflection efficiency and light convergence efficiency of the light introduced to the light guide plate 2 can be expected. The above explained v-shaped grooves 22 and the protrude portions 24 may be formed on the both sides of the light guide plate 2 (on the light reflection surface 2c and light emission surface 2b), and the protrude portion 24 is not necessarily formed near both sides of the V-shaped groove and may be formed near only one edge. The light guide plate 2 having the V-shaped grooves 22 and protrude portions 24 as such is formed as one body by injection molding.

As shown in FIG. 3, when being formed to be gradually denser from the light source 4 side of the light guide plate 2 to the end portion, the pitch $P_1$ between the adjacent V-shaped grooves 22 and 22 is normally 50 to 10000 µm, preferably 100 to 5000 µm, more preferably 500 to 2000 µm at an end portion close to the light source, while at the opposite end portion, the pitch is normally 10 to 1000 µm, preferably 30 to 500 µm, more preferably 50 to 100 µm.

Such a light guide plate 2 can be produced in the same way as in the above first embodiment. Note that a mold for injection molding of the light guide plate of the present embodiment is produced for example as below. At first, recesses are formed on a model mold plate by using a blade. When forming a recess by scratching the surface of the mold plate with the blade, protrude portions are normally formed on its both sides. An original model (light guide plate) for molding on which recesses and protruding portions are formed is prepared in this way and a mold is produced by performing electroformed molding on the same.

Third Embodiment

Figure 9:
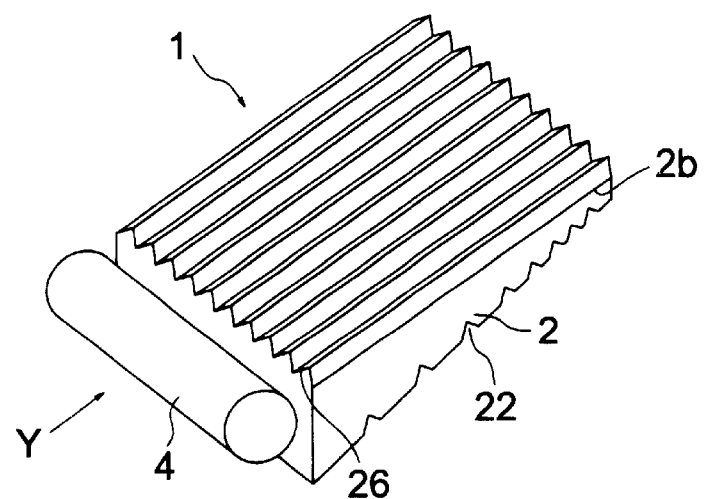
FIG. 9 is a perspective view of a use form of a light guide plate according to a third embodiment of the present invention.

In the present embodiment, as shown in FIG. 9, the point that light converging concave portions and convex portions 26 are further provided on the light emission surface 2b of the light guide plate 2 is different from the above first and second embodiments and other points are the same.

In the present embodiment, V-shaped grooves 22 as recesses are formed to be gradually denser or deeper from the light source 4 side of the light guide plate 2 to an end portion thereof. Namely, they are not always have to be formed to be gradually denser from the light source 4 side of the light guide plate 2 to the end portion, and may be formed at regular intervals but that the V-shaped grooves 22 become deeper. Also, the V-shaped grooves 22 as recesses may not necessarily provided on the light reflection surface 2c, and only later explained light convergence concave portions and convex portions 26 may be formed. In any case, as will be explained later on, by forming the light convergence concave portions and convex portions 26 on the light emission surface 2b of the light guide plate 2 as one body, it becomes unnecessary to provide a light convergence sheet separately from the light guide plate, and assembling procedures of a back-light can be simplified.

Figure 10:
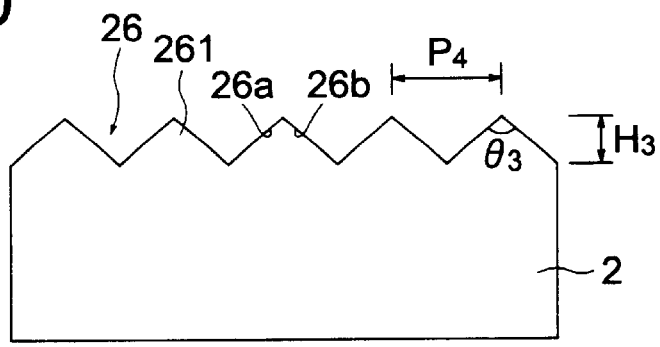
FIG. 10 is a partial perspective view of the light guide plate in FIG. 9 seen from the Y-direction in FIG. 9.

The light convergence concave portions and convex portions 26 have a function of making the direction of a light from the light source emitted from the light emission surface 2b of the light guide plate 2 as close as possible to the vertical direction and emitting it to the outside. Especially in the present embodiment, as shown in FIG. 10, the light convergence concave portions and convex portions 26 have an uneven surface of repetition of a fine prism shape 261.

A pitch $P_4$ between the adjacent prism shapes 261 and 261 is normally 20 to 200 µm, preferably 40 to 150 µm, more preferably 50 to 120 µm. By setting the pitch $P_4$ in the range, the light convergence performance is improved.

A height $H_3$ of the respective prism shapes 261 is normally 20 to 100 µm, preferably 40 to 80 µm, more preferably 50 to 70 µm. By setting the height $H_3$ in the range, the light convergence performance is improved.

An apex angle $\theta_3$ of the respective prism shapes 261 is preferably 60 to 140°, more preferably 70 to 120°. By setting the apex angle $\theta_3$ in the range, the light convergence performance is improved. An inclined surfaces 26a and 26a of the respective prism shapes 261 are preferably a shape close to a mirror surface state.

The shape of the light convergence concave portions and convex portions 26 is not limited to the prism shape 261 shown in FIGS. 9 and 10 and may be for example a protruding sectional shape of a sine or cosine curve, quadrilateral, rectangular, square, comb-tooth shape, etc. or protruding sectional shapes at a predetermined intervals.

The light guide plate 2 further having such light convergence concave portions and convex portions 26 is molded as one body by injection molding.

Figure 11:
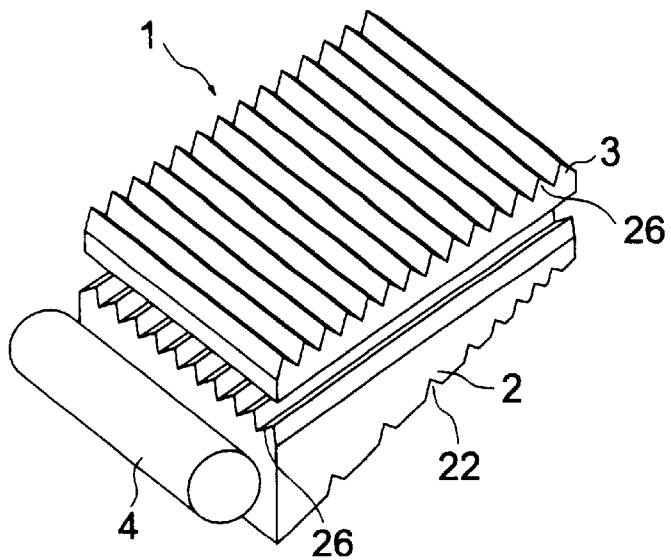
FIG. 11 is a perspective view of another use form of the light guide plate of the third embodiment of the present invention.

Also, as shown in FIG. 11, one or more light convergence sheets 3, such as a prism sheet, may be further overlapped on the above light convergence concave portions and convex portions 26 on the light guide plate 2 further having the light convergence concave portions and convex portions 26 for using. At this time, when using by overlapping only one light convergence sheet 3, it is preferable that a continuous line composing the prism shape 261 of the light guide plate 2 and a continuous line composing the prism shape of the light convergence sheet 3 are arranged so as to be approximately crossing perpendicularly to each other. By arranging in this way, further improvement of luminance efficiency can be expected.

A light guide plate 2 as such may be produced in the same way as in the above first embodiment.

Note that the present invention is not limited to the above embodiments and a variety of modification or changes can be made within the scope of the present invention.

EXAMPLE

Next, an explanation will be given of examples describing the embodiments of the present invention in further detail. The present invention, however, is not limited to these examples. Further, in the following examples and reference examples, the "parts" and "%" are based on weight unless otherwise indicated.

Measuring methods of a variety of physicality in the examples, reference examples and comparative examples are as below.

The hydrogenation rate of the main chain and the "hydrogenation rate (nuclear hydrogenation rate)" of the aromatic rings were measured by $^1$H-NMR.

The "glass transition temperature (Tg)" is measured based on JIS-K7121.

The "molecular weights" of the number average molecular weight (Mn) and weight average molecular weight (MW) are values measured by the gel permeation chromatography (GPC) method in a cyclohexane solution (toluene solution when resin will not dissolve) converted to polyisoprene (converted to polystyrene in the case of a toluene solution) unless otherwise indicated.

The "melt flow rate (MFR)" was measured by JIS-K6719 at a temperature of 280° C. and a load of 2.16 kgf.

The "refractive index" was measured based on the ASTM-D542 at 25° C.

The "water absorbent rate" was measured based on the ASTM-D570.

A varieties of evaluation on examples 1 to 22, a reference example 1 and comparative examples 1 to 2 were made as below.

The "transparency" was obtained by measuring the light transmittance (%) by a spectrophotometer (made by JASCO, Model No. U-30) while continuously changing the wavelength in the range of 400 to 900 nm and the minimum transmittance was made to be the light transmittance rate of the light guide plate.

The "luminance" was measured in a state that each of 100MX made by PC made by Kimoto Co., Ltd. as a diffusion sheet and BEF90made by Sumitomo 3M Ltd. were laminated on a light emission surface side of a molded light guide plate, and an average luminance thereof was used.

The average luminance was obtained by using a luminance meter (BM-7: made by Topcon Corporation) to measure luminance (in the vertical direction) at 9 points at regular intervals with respect to the long side and the short side of the light emission surface of the light guide plate (surface of a rectangular formed 1.5 cm inside the perimeter of the molding surface of the light guide plate) on which the above sheet structure was made, and calculating an average thereof.

The "luminance spots" was evaluated by measuring luminance (in the vertical direction) of the 9 points in the same way as in the evaluation of the above average luminance and evaluating the luminance spots=(maximum value/minimum value), and 85% or more were considered good.

The "hygroscopic deformation" was obtained by measuring size changes before and after a test of leaving a test piece under a humidity environment. The test conditions were to leave the test piece in a high temperature humid tank set to 50° C. and a humidity of 60% for one week and an existence of hygroscopic deformation (warps) was examined. Those which did not show any warps were evaluated to be "⊚", those which displayed a size change of more than 0% and less than 0.3% by warps was "○", a size change of 0.3% or more 5 and less than 1.0 are "Δ", and a size change of 1.0% or more were "x".

The "strength" was evaluated by measuring the IZOD strength of the molding material used for the light guide plate based on JIS-K7110.

As a test piece, a 2-A test piece having a notch was used. The evaluation was made on an average value of ten times of the measurements, and those which had the average value of 2.0 kgf·cm/cm$^2$ or more were evaluated to be "○", those which had 1.5 kgf·cm/cm$^2$ or more and less than 2.0 kgf·cm/cm$^2$ were "Δ", those which less than 1.5 kgf·cm/cm$^2$ were "x".

The "moldability" was visually judged on the molded piece (light guide plate) and evaluated based on the criteria below.

Those which showed no bubbles, surface sink, silver streaks in ten times of injection molding were evaluated to be "○", those which showed the above molding deficiencies in 1 to 2 samples in ten times of injection molding were "Δ", those which showed the above molding defects in more than 2 samples in ten times of injection molding were "x".

The "transferability" was evaluated visually whether or not recesses and projections are preferably formed based on the criteria of: "⊚" . . . completely no transfer deficiencies, "○" . . . no transfer deficiencies, "Δ" . . . a few transfer deficiencies, and "x" . . . striking transfer deficiencies.

Production Example 1

In a nitrogen atmosphere, 100 parts of 8-ethyltetracyclo [4.4.0.1$^{2,5}$.1,10]-dodeca-3-ene (hereinafter, ETCD for short) was polymerized by a well known metathesis ring-opening polymer catalyst system, and then performed hydrogenation in a well known method to obtain ETCD ring opening polymer hydrogenates. The ring opening polymer hydrogenates had Mw of 42000, the hydrogenation ratio of 99.8% or more, a Tg of 140° C., the water absorbent rate of 0.01% or less, the refractive index of 1.53 and an MFR of 19 g/10 min.

With respect to 100 parts of the pellets, 0.2 parts of phenol-based anti-aging agent, pentaerythrityl-tetrakis(3-(3, 5-di-tarsharybutyl-4-hydroxyphenyl)propionate) and 0.4 parts of hydrogenation styrene-butadiene-styrene-block copolymer (Tuftec H1051 (a crumb state) made by Asahi Chemical Industry Co.,Ltd. having a refractive index of 1.52 at 30° C.) were blended, mixed by twin-roll mixer, and the strand (stick-shaped melting resin) was pelletized by a strand cutter and a molding material in pellets (grains) was obtained. The pellets are heat pressed (a resin temperature of 200° C., 300 kgf/cm$^2$, for three minutes) to mold a plate of 20 mm×15 mm having a thickness of 0.3 mm was obtained. The plate is transparent and has the light transmittance rate of 90.0% at minimum.

Also, when the IZOD strength of the molding material was measured based on the on the JIS-K7110, an average value of measurements for 10 times was 3.00(kgf/cm$^2$).

Production Example 2

An ETCD/DCP ring opening copolymer hydrogenates was obtained in the same way as in the production example 1 excepting that the 100 parts of ETCD was replaced by 15 parts of ETCD and 85 parts (100 parts in total) of tricyclo [4.3.0.1$^{2,5}$]deca-3,7-diene (dicyclopentadiene, hereinafter, referred to as DCP). The copolymerization ratio of the norbornenes in the polymer was calculated from the composition of residual norbornenes in the solution after polymerization (by gas chromatography method) and ETCD/DCP=15/85 was found, which was substantially equal to the charged composition. The ring opening co polymer hydrogenates had a Mw of 40000, the hydrogenation ratio of 99.8%, the Tg of 104° C., the water absorbent rate of 0.01% or less, the refraction index was 1.53, and an MFR of 20 g/10 min. The resin was subjected to the same processing as in the production example 1 and a molding material in pellets was obtained. A plate was molded from the pellets under the same conditions as in the production example 1. The plate was transparent and had a light transmittance rat e of 90.2% at minimum at 400 to 700 nm.

Also, the IZOD strength was measured on the molding material based on the JIS-K7110, and the average value of measurements for 10 times was 3.15(kgf·cm/cm$^2$)

Example 1

A light guide plate was produced from the pellets of ETCD ring opening polymer hydrogenates produced in the production example 1 as a molding material by injection molding using a mold provided with V-shaped grooves in advance.

Molding conditions of the injection molding were that an injection molding machine made by a Toshiba Machine Co.,Ltd. production No. IS450, was used, a molding temperature was 110° C., a cylinder temperature was 290° C., a nozzle temperature was 260° C., an injection pressure was 1000 kgf/cm², a dwell pressure application was 800 kgf/cm², a mold clamping force was 1200 kgf/cm², an injection speed (corresponding to a screw proceeding speed) was 40 cm³/s, a screw back pressure was 70 kgf/cm², and a screw rotation rate was 30 rpm. The time from starting of filling to ending of filling to the mold was 1 second.

The obtained light guide plate was, as shown in FIG. 2, wedge-shaped wherein the thickness gradually became thinner from one end side to the other end side in the distance direction (an approximately vertical direction with respect to an axis center of a straight line shaped light source), the thickness on one side (2a side) was 2 mm, while 0.5 mm on the other side (2d side), a length from the one side to the other was 190 mm and a length along with the axis direction of the straight line shaped light source was 250 mm. Also, on the light reflection surface 2c side of the light guide plate was formed the V-shaped grooves 22, which is thin and long in the approximately vertical direction with respect to the direction of becoming distant from the light source 4 side (in the approximately parallel direction with respect to an axis center of the straight line shaped light source) and becomes gradually denser with the distance from the one end of the light guide plate to the other end, were preferably formed as one body without any transfer deficiencies.

Also, molding deficiencies, such as bubbles, surface sing, silver streaks, were not observed in the injection molding for ten times.

Note that, as shown in FIG. 3, the V-shaped grooves 22 have an apex angle θ of 1100, an angle θ1 of 145°, a groove width of about 140 μm, a pitch width near the light source of 0.5 to 2 mm, a pitch width near the end of 0.05 to 0.1 mm, and a groove depth of about 50 μm being uniform from near the light source to near the end.

When measuring the light transmittance rate of the light guide plate, the minimum light transmittance rate was 90.0% at 400 to 900 nm, which was preferable. Cracks, etc. did not occur at the time of taking out the light guide plate from the mold.

By using the obtained respective light guide plates, plane light source units of an edge light mode were produced. Specifically, a reflection tape of a production No. RF188 made by Tsujimoto Electric Co.,Ltd. was adhered on the side end surface other than a light incident end surface of the respective light guide plates, a cold cathode lamp having a tube diameter of 2.4 mmφ made by Harison Electric Co.,Ltd. was arranged at the light incident end portion on the side of the short side, and around the lamp and the light incident portion of the light guide plate were covered with a reflector of a production No. GR38W made by Kimoto Co.,Ltd. Furthermore, a light diffusion sheet of production No. PCM100MX made by Tsujimoto Electric Co.,Ltd. and a prism sheet BEF90 made by Sumitomo 3M Ltd. were arranged on the light emission surface side of the light guide plate, and a reflection sheet of production No. RF188 made by KK Tsujimoto was arranged on an opposite side of the light emission surface of the light guide plate to prepare a plane light source unit in an edge light mode.

Results of evaluation on average luminance, luminance spots and hygroscopic deformation by using the unit are listed in Table 1.

Example 2

A light guide plate was produced from the pellets of ring opening copolymer hydrogenates produced in the production example 2 as a molding material by injection molding under the same molding conditions.

The obtained light guide plate was wedge-shaped having the same size and shape as in the example 1, wherein the same V-shaped grooves were preferably formed as one body without any transfer defects. Also, molding deficiencies, such as bubbles, surface sing, silver streaks, were not observed in the injection molding for ten times.

When measuring the light transmittance rate of the light guide plate, the minimum light transmittance rate was 90.2% at 400 to 900 nm, which was preferable. Cracks, etc. did not occur at the time of taking out the light guide plate from the mold.

By using the obtained respective light guide plates, a plane light source unit of an edge light mode was produced in the same way as in the Example 1. Results of evaluation on average luminance, luminance spots and hygroscopic deformation by using the unit are listed in Table 1.

Reference Example 1

A light guide plate was produced from the pellets of ring opening copolymer hydrogenates produced in the production example 2 as a molding material by injection molding under the same molding conditions but by using a mold on which V-shaped grooves of a different pattern from that in the Example 1 and 2 are provided in advance.

The obtained light guide plate was wedge-shaped having the same size and shape as those in the example 1, wherein the same V-shaped grooves were formed at intervals of a certain pitch width of 0.5 mm corresponding to the average pitch width in the examples 1 and 2 from the light source side to the opposite side. There was no transfer deficiencies and the grooves were preferably molded as one body. Also, molding deficiencies, such as bubbles, surface sing, silver streaks, were not observed in the injection molding for ten times.

When measuring the light transmittance rate of the light guide plate, the minimum light transmittance rate was 90.2% at 400 to 900 nm, which was preferable. Cracks, etc. did not occur at the time of taking out the light guide plate from the mold.

By using the obtained respective light guide plates, a plane light source unit of an edge light mode was produced in the same way as in the Example 1, and evaluation was made on the average luminance, luminance spots and hygroscopic deformation. Results are listed in Table 1.

Comparative Example 1

Instead of using the pellets of the production examples 1 and 2, polymethyl methacrylate (PMMA) (made by Sumitomo Chemical Co.,Ltd. production No. Sumipex MG5) was used for producing pellets for use in the same way as in the examples 1 and 2. When measuring the IZOD strength of the molding material in the same way as in the examples 1 and 2, the average value was 1.60 (kgf·cm/cm²).

A light guide plate was produced by using the molding material and the same mold under the same molding conditions as in the examples 1 and 2.

The obtained light guide plate was wedge-shaped having the same size and shape as those in the examples 1 and 2, but there arose a transfer deficiency in the V-shaped grooves at the end portion of the wedge shape. Also, such a molding deficiency was observed in all of the injection molding performed for ten times. Among 10 samples, surface sink occurred at the end portion of the wedge portion in 3 samples, and silver streaks due to bubbles in the resin was observed in all of the samples.

When measuring the light transmittance of the light guide plate, the minimum light transmittance rate was 90.0% at 400 to 900 nm, which was preferable. Cracks arose at the end portion of the wedge shape (on the reflected light incident surface side) at the time of taking out the light guide plate from the mold.

By using the obtained light guide plate, a plane light source unit of an edge light mode was produced in the same way as in the Example 1, and evaluation was made on the average luminance, luminance spots and hygroscopic deformation. Results are listed in Table 1.

Comparative Example 2

Instead of using the pellets of the production examples 1 and 2, polycarbonate (PC) (made by Teijin Chemical Ltd. production No. Panlite-122) was used for producing pellets for use in the same way as in the examples 1 and 2. When measuring the IZOD strength of the molding material in the same way as in the examples 1 and 2, the average value was 5.90 (kgf·cm/cm$^2$).

A light guide plate was produced by using the molding material and the same mold under the same molding conditions as in the examples 1 and 2.

The obtained light guide plate was wedge-shaped having the same size and shape as those in the examples 1 and 2, but there arose a transfer deficiency in V-shaped grooves at the end portion of the wedge shape. Also, such a molding deficiency was observed in all of the injection molding performed for ten times. Among 10 samples, surface sink occurred at the end portion of the wedge portion in 6 samples, and bubbles considered to be caused by hydrolysis and silver streaks in the resin were observed in all of the samples.

When measuring the light transmittance of the light guide plate, the minimum light transmittance rate was 82.5% at 400 to 900 nm, which was a little poor result. Cracks did not occur at the time of taking out the light guide plate from the mold.

By using the obtained light guide plate, a plane light source unit of an edge light mode was produced in the same way as in the Example 1, and evaluation was made on the average luminance, luminance spots and hygroscopic deformation. Results are listed in Table 1.

TABLE 1

| | | Example 1 | Example 2 | Reference Example 1 | Comparative Example 1 | Comparative Example 2 |
|---|---|---|---|---|---|---|
| Molding Material | | Production Example 1 | Production Example 2 | → | PMMA | PC |
| Material Physicality | Refraction Index | 1.53 | 1.53 | → | 1.49 | 1.58 |
| | IZOD Strength (kgf·cm/cm$^2$) | 300 | 3.15 | → | 1.60 | 5.90 |
| V-Shaped Groove | | ○ | ○ | → | Δ | ○ |
| | Angle (°) | 110 | → | → | → | → |
| | Depth (μm) | 50 | → | → | → | → |
| | Width (mm) | about 0.14 | → | → | → | → |
| | Pitch on Light Source Side (mm) | 0.5~2 | → | 0.5 | 0.5~2 | → |
| | Pitch on Opposite Side (mm) | 0.05~0.1 | → | 0.5 | 0.05~0.1 | → |
| Minimum Light Transmittance (%) | | 90.0 | 90.2 | 90.2 | 90.0 | 82.5 |
| Mechanical Strength of Light Guide Plate (When Reliesing from Mold) | | No Breaks, Cracks, etc. | → | → | Breaks at End of Wedge Shape | No Breaks, Cracks, etc. |
| Transferability | | ○ | ⊚ | ⊚ | Δ | x |
| Moldability | | ○ | ○ | ○ | x | x |
| Average Luminance (cd/cm$^2$) | | 1660 | 1710 | 1500 | 1600 | 1470 |
| Luminance Spots (%) | | Good | Good | Good | Good | Good |
| Hygroscopic Deformation | | ⊚ | ⊚ | ⊚ | x | ○ |

Examples 3 to 12 light guide plates were produced from the pellets of ring opening (co)polymer hydrogenates produced in the production example 1 (examples 3 to 7) and the production example 2 (examples 8 to 12) as a molding material by injection molding respectively using the same mold as in the examples 1 and 2 under the same molding conditions.

The respectively obtained light guide plates had the same wedge shape as in the examples 1 and 2. Also, the V-shaped grooves which is thin and long in the approximately vertical direction with respect to the direction of becoming distant from the light source 4 side and becomes gradually denser with the distance from the one end of the light guide plate to the other end in the same way as in the examples 1 and 2, were preferably formed as one body without any transfer deficiencies in the examples 3 to 7, and in the examples 8 to 12, there were perfectly no transfer deficiency.

Note that, as shown in FIG. 3, the V-shaped grooves 22 were the same as in the examples 1 and 2 in the pitch width and groove depth both near the light source and near the end except for the angle and groove width.

The angle of the V-shaped grooves 22 were 75° (examples 3 and 8), 95° (examples 4 and 9), 110° (examples 5 and 10), 125° (examples 6 and 11), and 145° (examples 7 and 12), respectively.

When measuring the total light transmittance rate of the light guide plate, it was 90.0% in the examples 3 to 7 and 90.2% in the examples 8 to 12, which was preferable.

By using the obtained light guide plates, plane light source units of an edge light mode as same as in the examples 1 and 2 were produced.

Results of evaluation on the average luminance, luminance spots and hygroscopic deformation by using the units are listed in Table 2.

TABLE 2

|  | | Example 3 | Example 4 | Example 5 | Example 6 | Example 7 | Example 8 | Example 9 | Example 10 | Example 11 | Example 12 |
|---|---|---|---|---|---|---|---|---|---|---|---|
| Molding Material | | Production Example 1 | → | → | → | → | Production Example 2 | → | → | → | → |
| V-Shaped Groove | Angle (°) | 75 | 95 | 110 | 125 | 145 | 75 | 95 | 110 | 125 | 145 |
| | Depth ($\mu$m) | 50 | → | → | → | → | → | → | → | → | → |
| | Pitch on Light Source Side | 0.5~2 | → | → | → | → | → | → | → | → | → |
| | Pitch on Opposite Side (mm) | 0.05~0.1 | → | → | → | → | → | → | → | → | → |
| Minimum Light Transmittance (%) | | 90.0 | → | → | → | → | 90.2 | → | → | → | → |
| Transferability | | ○ | ○ | ○ | ○ | ○ | ⊚ | ⊚ | ⊚ | ⊚ | ⊚ |
| Moldability | | ○ | ○ | ○ | ○ | ○ | ○ | ○ | ○ | ○ | ○ |
| Average Luminance (cd/cm$^2$) | | 1510 | 1600 | 1660 | 1630 | 1580 | 1550 | 1660 | 1710 | 1670 | 1650 |
| Luminance Spots (%) | | Good | Good | Good | Good | Good | Good | Good | Good | Good | Good |
| Hygroscopic Deformation | | ⊚ | ⊚ | ⊚ | ⊚ | ⊚ | ⊚ | ⊚ | ⊚ | ⊚ | ⊚ |

Examples 13 to 22

Light guide plates were produced from the pellets of ETCD ring opening monomer hydrogenates produced in the production example 1 (examples 13 to 17) and the production example 2 (examples 18 to 22) as a molding material by injection molding under the same molding conditions as in the examples 1 and 2 but by using respective molds wherein only depth of the V-shaped groove is different.

The obtained light guide plates had the same wedge shape as in the examples 1 and 2.

As shown in FIG. 2, all of the V-shaped grooves 22 had an angle of 110°, a pitch width of 0.5 to 2 mm near the light source and 0.05 to 0.1 mm near the end except the depth and the width of the grooves.

The depth of the V-shaped grooves 22 were respectively 30 $\mu$m (examples 13 and 18), 40 $\mu$m (examples 14 and 19), 60 $\mu$m (examples 15 and 20), 80 $\mu$m (examples 16 and 21) and 100 km (examples 17 and 22) being uniform from near the light source to near the end portion.

When measuring the total light transmittance rate of the light guide plates, it was 90.0% in the examples 13 to 17 and 90.2% in the examples 18 to 22, which were preferable.

By using the obtained light guide plates, plane light source units of an edge light mode as same as in the examples 1 and 2 were produced.

Results of evaluation on the average luminance, luminance spots and hygroscopic deformation by using the units are listed in Table 3.

TABLE 3

|  | | Example 13 | Example 14 | Example 15 | Example 16 | Example 17 | Example 18 | Example 19 | Example 20 | Example 21 | Example 22 |
|---|---|---|---|---|---|---|---|---|---|---|---|
| Molding Material | | Production Example 1 | → | → | → | → | Production Example 2 | → | → | → | → |
| V-Shaped Groove | Angle (°) | 110 | → | → | → | → | → | → | → | → | → |
| | Depth ($\mu$m) | 30 | 40 | 60 | 80 | 100 | 30 | 40 | 60 | 80 | 100 |
| | Pitch on Light Source Side (mm) | 0.5~2 | → | → | → | → | → | → | → | → | → |
| | Pitch on Opposite Side (mm) | 0.05~0.1 | → | → | → | → | → | → | → | → | → |
| Minimum Light Transmittance (%) | | 90.0 | → | → | → | → | 90.2 | → | → | → | → |
| Transferability | | ○ | ○ | ○ | ○ | ○ | ⊚ | ⊚ | ⊚ | ⊚ | ⊚ |
| Moldability | | ○ | ○ | ○ | ○ | ○ | ○ | ○ | ○ | ○ | ○ |
| Average Luminance (cd/cm$^2$) | | 1615 | 1630 | 1650 | 1625 | 1615 | 1665 | 1685 | 1700 | 1680 | 1670 |
| Luminance Spots (%) | | Good | Good | Good | Good | Good | Good | Good | Good | Good | Good |
| Hygroscopic Deformation | | ⊚ | ⊚ | ⊚ | ⊚ | ⊚ | ⊚ | ⊚ | ⊚ | ⊚ | ⊚ |

Consideration 1

From the Table 1, it was confirmed that units wherein the light guide plate of the examples 1 and 2 (polymeric resin having a alicyclic structure) was used have higher luminance and no luminance spots and are superior in hygroscopic deformation comparing with units wherein the light guide plate of the comparative examples 1 and 2 (PMMA, PC) was used. Also, from the Table 1, units using the light guide plate of the example 2 (the pitch of the grooves is variable from scarce to dense) have less luminance spots than that of the reference example 1 (the pitch of the grooves is at regular intervals).

From the Table 2, it was confirmed that the units using a light guide plate of the examples 8 to 12 are superior in transferability of the grooves and have higher luminance than the units of the examples 13 to 17.

From the Table 3, it was confirmed that the units using the light guide plate of the examples 18 to 22 are superior in transferability of the grooves and have higher luminance comparing with the units of the examples 13 to 17.

A variety of evaluation on the examples 23 to 53 and the comparison example 3 shown below was made as follows.

The "luminance" was measured in the same way as in the above examples 1 to 22.

The "luminance line evaluation" was visually confirmed the luminous surface on the light guide plate and judged to be "⊚" when the luminance line is almost unable to be seen, "Δ" when the luminance line is recognized dimly, "x" when the luminance line is clearly seen. The harder it is to see the luminance line, the more improved the image quality becomes.

The "color temperature" was measured by using a luminance meter (BM-7: made by Topcon Corporation) a color temperature (in the vertical direction) at 9 points on the luminescence surface by using the same method and evaluated by judging the average value of 6500K (kelvin, the same below) to 7500K to be "⊚", 6000K to 7000K to be "○", and less than 6000K to be "x". The higher the color temperature is, the less the effects on how it looks and more superior it becomes as a light guide plate.

The "heat resistance" was by measuring size changes due to an environment change (temperature change). Since the light guide plate is normally to be turned on for a long period of time, it is liable that the size change due to a temperature becomes a problem. Therefore, as representative characteristics, the size change (%) was measured after leaving the light guide plate in a gear oven at 80° for 24 hours and evaluated. The less the size change is, the more superior in heat resistance.

The "light resistance" was evaluated by measuring the total light transmittance, luminance and luminance spots of a test piece after irradiated UV light by a fadometer (black panel temperature 63° C. for 720 hours). A test piece with a value of "total light transmittance after test/total light transmittance before test)×100 of 98% or more was judged as "⊚(very good)", 96% or more and less than 98% as "○(good)", 94% or more and less than 96% as "Δ(fair)", and less than 94% as "x (poor)". The luminance and the luminance spots were measured based on the measurement method of luminance in the above examples 1 to 22 and in the comparative examples 1 to 3.

The "transferability" was judged whether recesses and projections were preferably transferred or not by a contact surface roughness measurer, and evaluated based on the criteria of "⊚" . . . completely no transfer defects, "○" . . . no transfer defects, "Δ" . . . a few transfer detects, and "x" . . . striking transfer defects.

Production Example 3

An ETCD/DCP ring opening copolymer hydrogenates was obtained in the same way as in the production example 1 excepting that the 100 parts of ETCD was replaced by 65 parts of ETCD and 35 parts of DCP replaced (100 parts in total). When the copolymerization ratio of the norbornenes in the polymer was calculated from the composition of residual norbornenes in the solution after polymerization (by gas chromatography method), ETCD/DCP=65/35 was obtained which was substantially equal to the charged composition. The ETCD/DCP ring opening copolymer hydrogenates had a Mw of 35000, the hydrogenation ratio of 99.8%, the Tg of 125° C., the water absorbent rate of 0.01% or less, the refraction index of 1.53, and the MFR of 35 g/10 min. The resin was subjected to the same processing as in the production example 1 and a molding material in pellets was obtained. A plate was molded from the pellets under the same conditions as in the production example 1. The plate was transparent and had a light transmittance rate of 90.2% at minimum at 400 to 700 nm.

Production Example 4

An ETCD/DCP ring opening copolymer hydrogenates was obtained in the same way as in the production example 1 excepting that the 100 parts of ETCD was replaced by 75 parts of ETCD and 25 parts of DCP (100 parts in total). When the copolymerization ratio of the norbornenes in the polymer was calculated from the composition of residual norbornenes in the solution after polymerization (by gas chromatography method), ETCD/DCP=75/25 was obtained which was substantially equal to the charged composition. The ETCD/DCP ring opening copolymer hydrogenates had the Mw of 35000, the hydrogenation ratio of 99.8%, the Tg of 130° C., the water absorbent rate of 0.01% or less, the refraction index of 1.53, and the MFR of 35 g/10 min. The resin was subjected to the same processing as in the production example 1 and a molding material in pellets was obtained. A plate was molded from the pellets under the same conditions as in the production example 1. The plate was transparent and had a light transmittance rate of 90.2% at minimum at 400 to 700 nm.

Production Example 5

An ETCD/DCP ring opening copolymer hydrogenates was obtained in the same way as in the production example 1 excepting that the 100 parts of ETCD was replaced by 85 parts of ETCD and 15 parts of DCP (100 parts in total). When the copolymerization ratio of the norbornenes in the polymer was calculated from the composition of residual norbornenes in the solution after polymerization (by gas chromatography method), ETCD/DCP=85/15 was obtained which was substantially equal to the charged composition. The ETCD/DCP ring opening copolymer hydrogenates had the Mw of 35000, the hydrogenation ratio of 99.8%, the Tg of 134° C., the water absorbent rate of 0.01% or less, the refraction index of 1.53, and the MFR of 35 g/10 min. The resin was subjected to the same processing as in the production example 1 and a molding material in pellets was obtained. A plate was molded from the pellets under the same conditions as in the production example 1. The plate was transparent and had a light transmittance rate of 90.2% at minimum at 400 to 700 nm.

Production Example 6

An ETCD/DCP ring opening copolymer hydrogenates was obtained in the same way as in the production example 1 excepting that the 100 parts of ETCD was replaced by 95 parts of ETCD and 5 parts of DCP (100 parts in total). When the copolymerization ratio of the norbornenes in the polymer was calculated from the composition of residual norbornenes in the solution after polymerization (by gas chromatography method), ETCD/DCP=95/5 was obtained which was substantially equal to the charged composition. The ETCD/DCP ring opening copolymer hydrogenates had the Mw of 35000, the hydrogenation ratio of 99.8%, the Tg of 139° C., the water absorbent rate of 0.01% or less, the refraction index of 1.53, and the MFR of 35 g/10 min. The resin was subjected to the same processing as in the production example 1 and a molding material in pellets was obtained. A plate was molded from the pellets under the same conditions as in the production example 1. The plate was transparent and had a light transmittance rate of 90.2% at minimum at 400 to 700 nm.

Examples 23 to 28

Light guide plates were produced from pellets of the ETCD ring opening (co)polymer hydrogenates produced in the production examples 1 to 6 as a molding material by injection molding under the same molding conditions as in the example 1.

The obtained light guide plate had the V-shaped grooves 22 on the light reflection surface 2c side in the same way as in the example 1 and furthermore, protruding portions 24 and 24 were preferably formed as one body near both edges of the V-shaped grooves 22 without any transfer deficiencies.

Note that, as shown in FIG. 3, the V-shaped groove 22 had an angle of 110°, a groove width of about 140 μm, a pitch width of 0.5 to 2 mm near the light source and 0.05 to 0.1 mm near the end, and the groove depth of about 50 μm being uniform from near the light source to near the end portion. The protrude portions had a width of 140 μm and a uniformed height of about 35 μm from near the light source to near the end portion. The ratio of a cross sectional area of V-shaped groove 22 (an amount of one cross sectional area) and a cross sectional area of the protrude portion 24 (an amount of one cross sectional area) was almost 2:1 (=10:5).

By using the obtained light guide plates, plane light source units of an edge light mode as same as in the example 1 were produced. Results of evaluation on luminance, luminance line evaluation, color temperature, transferability, heat resistance and light resistance are listed in Table 4.

Example 29

A light guide plate was produced in the same way by injection molding under the same molding conditions as in the examples 23 to 28 excepting that the resin produced in the production examples 2 was used and the groove providing pattern was made to have the same number of grooves as in the examples 23 to 28 but to have a constant pitch. A plane light source unit of an edge light mode was produced in the same way. Results of evaluation on luminance, luminance line evaluation, color temperature, transferability, heat resistance and light resistance by using the unit are listed in Table 4.

Comparative Example 3

The same light guide plate was produced under the same molding conditions as in the examples 23 to 28 excepting that the same polymethyl methacrylate in the comparative example 1 was used.

On the light reflection surface side of the obtained light guide plate was formed the V-shaped grooves in the same way as in the examples 23 to 28, but chipping, size deficiency, deformation, etc. were confirmed at the protrude portions near the both edges of the V-shaped grooves.

A plane light source unit of an edge light mode was produced by using the obtained light guide plate in the same way as in the examples 23 to 28. Results of evaluation on luminance, luminance line evaluation, color temperature, transferability, heat resistance and light resistance by using the unit are listed in Table 4.

TABLE 4

| | Resin | | | | | |
|---|---|---|---|---|---|---|
| | Resin Example | Production Example | Ratio of Units without NB ring | Defraction Index of resin | Water Absorbency of Resin (%) | Light transmittance of Resin (%) |
| Example 23 | ETCD/DCP = 15/85 | Production Example 2 | 85 | 1.53 | <0.01 | 90.2 |
| Example 24 | ETCD/DCP = 65/35 | Production Exampl 3 | 35 | ↓ | ↓ | ↓ |
| Example 25 | ETCD/DCP = 75/25 | Production Example 4 | 25 | ↓ | ↓ | ↓ |
| Example 26 | ETCD/DCP = 85/15 | Production Example 5 | 15 | ↓ | ↓ | ↓ |
| Example 27 | ETCD/DCP = 95/5 | Production Example 6 | 5 | ↓ | ↓ | ↓ |
| Example 28 | ETCD100 | Production Example 1 | 0 | ↓ | ↓ | 90.0 |
| Example 29 | ETCD/DCP = 15/85 | Production Example 2 | 85 | ↓ | ↓ | 90.2 |
| Comparative Example 3 | PMMA | — | — | 1.49 | 0.3 | 90.0 |

| | Reflection Pattern Data | | | | |
|---|---|---|---|---|---|
| | Ratio of Cross Sectional Area of Recess and Projection (Amount of One) | Height of Projection (μm) | Width of Projection (μm) | Groove Pitch (on Light Source Side) | Groove Pitch (on End Side) |
| Example 23 | 2:1 | 35 | 140 | 0.5~2 | 0.05~0.1 |
| Example 24 | ↓ | ↓ | ↓ | ↓ | ↓ |
| Example 25 | ↓ | ↓ | ↓ | ↓ | ↓ |
| Example 26 | ↓ | ↓ | ↓ | ↓ | ↓ |
| Example 27 | ↓ | ↓ | ↓ | ↓ | ↓ |
| Example 28 | ↓ | ↓ | ↓ | ↓ | ↓ |
| Example 29 | ↓ | ↓ | ↓ | Constant | Constant |
| Comparative | ↓ | ↓ | ↓ | 0.5~2 | 0.05~0.1 |

TABLE 4-continued

Example 3

| | Initial Characteristics Evaluation | | | | |
|---|---|---|---|---|---|
| | Average Luminance (cd/cm²) | Luminance Spots | Color temperature (%) | Heat Resistance (%) | Transferability |
| Example 23 | 1780 | ◎ | ◎ | 0 | ◎ |
| Example 24 | 1755 | ◎ | ◎ | ↓ | ◎ |
| Example 25 | 1750 | ◎ | ◎ | ↓ | ◎ |
| Example 26 | 1735 | ◎ | ◎ | ↓ | ◎ |
| Example 27 | 1725 | ◎ | ◎ | ↓ | ◎ |
| Example 28 | 1710 | ◎ | ◎ | ↓ | ◎ |
| Example 29 | 1590 | ◎ | ○ | ↓ | ◎ |
| Comparative Example 3 | 1685 | ◎ | ◎ | 3 | x Transfer Deficiency & Removal from Mold Defficiency |

| | Light Resistance Evaluation | | |
|---|---|---|---|
| | Total Light transmittance (%) | Average Luminance (cd/cm²) | Luminance Spots |
| Example 23 | ◎ | ◎ | ◎ |
| Example 24 | ◎ | ◎ | ◎ |
| Example 25 | ◎ | ○ | ◎ |
| Example 26 | ○ | ○ | ◎ |
| Example 27 | ○ | ○ | ○ |
| Example 28 | ○ | ○ | ○ |
| Example 29 | ◎ | ◎ | ◎ |
| Comparative Example 3 | ◎ | ◎ | ◎ |

V-shaped grooves of angle = 110°, depth = 50 µs, Width = about 140 µm were provided as a reflection pattern.

Examples 30 to 37

Light guide plates were respectively produced under the same molding conditions as in the examples 23 to 28 excepting that the ring opening copolymer hydrogenates produced in the production example 2 was used as a molding material, molds respectively having a height of a protrude portion of 15 µm (example 30), 20 µm (example 31), 25 µm (example 32), 35 µm (example 33), 70 µm (example 34), 100 µm (example 35), 120 µm (example 36) and 150 µm (example 37) being uniform from near the light source to near the end portion were used, and the ratio of cross sectional areas of the recesses and the projections was controlled.

The obtained light guide plates had the same wedge shape as those in the examples 23 to 28. Note that the V-shaped grooves were also the same as in those in the examples 23 to 28 in the angle, groove width, and the pitch width and groove depth near the light source and near the end portion. The ratio of a sectional area of the V-shaped groove and that of the protrude portion was made to be 12:1 (example 30), 7:1 (example 31), 4:1 (example 32), 2:1 (example 33), 1:2 (example 34), 1:4 (example 35), 1:7 (example 36) and 1:12 (example 37).

Plane light source units of an edge light mode were produced by using the obtained light guide plates in the same way as in the examples 23 to 28. Results of evaluation on luminance and luminance line evaluation by using the units are listed in Table 5.

TABLE 5

| | Resin | | Reflection Pattern Data | | | | | Initial Characteristics Evaluation | |
|---|---|---|---|---|---|---|---|---|---|
| | Resin Example | Production Example | Recess: Projections (Amount of 1 Cross Secrional Area Rate) | Projection Height (µm) | Projection Width (µm) | Pitch (Light Source Side) | Pitch (End Side) | Average Luminance (cd/cm²) | Luminance Spots |
| Embodiment 30 | ETCD/DCP = 15/85 | Production Example 2 | 12:1 | 15 | 55 | 0.5~2 | 0.05~0.1 | 1110 | ○ |
| Embodiment 31 | ↓ | ↓ | 7:1 | 20 | 70 | ↓ | ↓ | 1125 | ◎ |
| Embodiment 32 | ↓ | ↓ | 4:1 | 25 | 100 | ↓ | ↓ | 1145 | ◎ |

TABLE 5-continued

|  | Resin | | Reflection Pattern Data | | | | | Initial Characteristics Evaluation | |
| --- | --- | --- | --- | --- | --- | --- | --- | --- | --- |
|  |  |  | Recess: Projections | Projection | Projection |  |  | Average | |
|  | Resin Example | Production Example | (Amount of 1 Cross Secrional Area Rate) | Height ($\mu$m) | Width ($\mu$m) | Pitch (Light Source Side) | Pitch (End Side) | Luminance (cd/cm$^2$) | Luminance Spots |
| Embodiment 33 | ↓ | ↓ | 2:1 | 35 | 140 | ↓ | ↓ | 1170 | ◉ |
| Embodiment 34 | ↓ | ↓ | 1:2 | 70 | 300 | ↓ | ↓ | 1155 | ◉ |
| Embodiment 35 | ↓ | ↓ | 1:4 | 100 | 400 | ↓ | ↓ | 1135 | ◉ |
| Embodiment 36 | ↓ | ↓ | 1:7 | 120 | 580 | ↓ | ↓ | 1115 | ◉ |
| Embodiment 37 | ↓ | ↓ | 1:12 | 150 | 800 | ↓ | ↓ | 1105 | ○ |

V-shaped grooves of angle = 110°, depth = 50 $\mu$m, Width = about 140 $\mu$m were provided as a reflection pattern.

Examples 38 to 45

Light guide plates were respectively produced under the same molding conditions as in the examples 23 to 28 excepting that the ring opening copolymer hydrogenates produced in the production example 2 was used and molds respectively having an angle of the V-shaped groove of 60° (example 38), 75° (example 39), 90° (example 40), 100° (example 41), 120° (example 42), 130° (example 43), 145° (example 44) and 160° (example 45) were used.

The obtained light guide plates were the same wedge shape as those in the examples 23 to 28. Note that the V-shaped grooves were the same as in those in the examples 23 to 28 in the pitch width and groove depth of near the light source and near the end portion except for the angle and groove width. Also, the width and the height of the protrude portions were the same as those in the examples 23 to 28. The ratio of the sectional area of the V-shaped groove and that of the protrude portion was almost 2:1 (=10:5), respectively.

A plane light source unit of an edge light mode was produced by using the obtained light guide plate in the same way as in the examples 23 to 28. Results of evaluation on luminance and luminance line evaluation by using the unit are listed in Table 6.

Examples 46 to 53

Light guide plates were respectively produced under the same molding conditions as in the examples 23 to 28 excepting that the ring opening copolymer hydrogenates produced in the production example 2 was used and molds respectively having a depth of the V-shaped grooves of 5 $\mu$m (example 46), 20 $\mu$m (example 47), 30 $\mu$m (example 48), 40 $\mu$m (example 49), 60 $\mu$m (example 50), 80 $\mu$m (example 51), 90 $\mu$m (example 52) and 120 $\mu$m (example 53).

The obtained light guide plates had the same wedge shape as those in the examples 23 to 28. Note that the V-shaped grooves were the same as those in the examples 23 to 28 in the angle and the pitch width near the light source and near the end portion, except for the groove depth and groove width. Also, the width and the height of the protrude portions were the same as those in the examples 23 to 28. The ratio of the sectional area of the V-shaped groove and that of the protrude portion was almost 2:1 (=10:5), respectively.

Plane light source units of an edge light mode were produced by using the obtained light guide plates in the same way as in the examples 23 to 28. Results of evaluation on luminance and luminance line evaluation by using the unit are listed in Table 7.

TABLE 6

|  | Resin | | Reflection Pattern Data | | | | | Initial Characteristics Evaluation | |
| --- | --- | --- | --- | --- | --- | --- | --- | --- | --- |
|  | Resin Example | Production Example | Angle (°) | Depth ($\mu$m) | Width ($\mu$m) | Pitch (Light Source Side) | Pitch (End Side) | Average Luminance (cd/cm$^2$) | Luminance Spots |
| Example 38 | ETCD/DCP = 15/85 | Production Example 2 | 60 | 50 | 220 | 0.5~2 | 0.05~0.1 | 1040 | ◉ |
| Example 39 | ↓ | ↓ | 75 | ↓ | 270 | ↓ | ↓ | 1105 | ◉ |
| Example 40 | ↓ | ↓ | 90 | ↓ | 330 | ↓ | ↓ | 1135 | ◉ |
| Example 41 | ↓ | ↓ | 100 | ↓ | 360 | ↓ | ↓ | 1165 | ◉ |
| Example 42 | ↓ | ↓ | 120 | ↓ | 440 | ↓ | ↓ | 1165 | ◉ |
| Example 43 | ↓ | ↓ | 130 | ↓ | 470 | ↓ | ↓ | 1130 | ◉ |
| Example 44 | ↓ | ↓ | 145 | ↓ | 530 | ↓ | ↓ | 1100 | ◉ |
| Example 45 | ↓ | ↓ | 160 | ↓ | 580 | ↓ | ↓ | 1050 | ◉ |

Shapes of the recess and projection are the same as those in the example 23.

TABLE 7

| | Resin | | | Reflection Pattern Data | | | | Initial Characteristics Evaluation | |
|---|---|---|---|---|---|---|---|---|---|
| | | | | | | | | Average | |
| | Resin Example | Production Example | Angle (°) | Depth (μm) | Width (μm) | Pitch (Light Source Side) | Pitch (End Side) | Luminance (cd/cm$^2$) | Luminance Spots |
| Example 46 | ETCD/DCP = 15/85 | Production Example 2 | 110 | 5 | 40 | 0.5~2 | 0.05~0.1 | 1040 | ◉ |
| Example 47 | ↓ | ↓ | ↓ | 20 | 160 | ↓ | ↓ | 1090 | ◉ |
| Example 48 | ↓ | ↓ | ↓ | 30 | 240 | ↓ | ↓ | 1130 | ◉ |
| Example 49 | ↓ | ↓ | ↓ | 40 | 320 | ↓ | ↓ | 1165 | ◉ |
| Example 50 | ↓ | ↓ | ↓ | 60 | 480 | ↓ | ↓ | 1165 | ◉ |
| Example 51 | ↓ | ↓ | ↓ | 80 | 640 | ↓ | ↓ | 1130 | ◉ |
| Example 52 | ↓ | ↓ | ↓ | 90 | 720 | ↓ | ↓ | 1100 | ◉ |
| Example 53 | ↓ | ↓ | ↓ | 120 | 960 | ↓ | ↓ | 1050 | ◉ |

Shapes of the recess and projection are the same as those in the example 23.

Consideration 2

From the Table 4, the more the content of repeating units not having a norbornane ring (examples 23 to 26 and 29), the more the average luminance and light resistance improve. Also, when comparing by the same resin, the one having protrude portions (example 23) has higher average luminance (see Table 1) than the one without them (example 2). By comparing by the same resin, even the one having the protrude portions has low luminance if the pitch of providing them is constant (example 29). When comparing with PMMA (comparative example 3), the front face luminance is lower than that in the examples 23 to 28 due to low transferability, and heat resistance is also inferior.

From the Table 5, by setting the area ratio of the recesses and projections in the effective range of the present invention (examples 31 to 36), the more excellent effects are obtained than the ones with a simple V-shaped grooves and it was confirmed that luminance became higher and the luminance line becomes invisible.

From the Table 6, by setting the angle of the V=shaped grooves in the effective range of the present invention (examples 39 to 44), it was confirmed that improvement in luminance was observed.

From the Table 7, by setting the depth of the V-shaped groove in the effective range of the present invention (examples 47 to 52), it was confirmed that improvement in luminance was observed.

A variety of evaluations on the examples 54 to 56 and comparison examples 4 and 5 below were made in the following way.

The "transparency" and "luminance spots" were evaluated in the same way as in the above examples 1 to 22.

The "color temperature" and "light resistance" were evaluated in the same way as in the above examples 23 to 53.

The "heat resistance" was evaluated in the same way as in the above examples 23 to 53 except for holding at 100° C. in a gear oven for 24 hours.

The "transferability" was evaluated visually whether or not the recesses and projections for light convergence are preferably transferred by the criteria of: ◉ . . . completely no transfer default, ○ . . . no transfer default, Δ . . . a little transfer default, x . . . striking transfer default.

Production Example 7

In the nitrogen atmosphere, 50 parts of tetracyclo[4.4.0.1$^{2,5}$.1$^{7,10}$]-dodeca-3-ene (also referred to as 1,4:5,8-dimethano-1,4,4a,5,6,7,8,8a-octahydronaphthalene. Hereinafter TCD for short.) and 50 parts of tetracyclo[7.4.0.1$^{10,13}$.0$^{2,7}$]trideca-2,4,6,11-tetraene (also referred to as 1,4-methano-1,4,4a,9a-tetrahydro fluorene. Hereinafter MTF for short) (100 parts in total) were polymerized by a well known metathesis ring opening polymer catalyst system, and then performed hydrogenation in a well known method to obtain TCD/MTF ring opening copolymer hydrogenates. When the copolymerization ratio of the norbornenes in the polymer was calculated from the composition of residual norbornenes in the solution after polymerization (by gas chromatography method), TCD/MTF=50/50 was obtained which was substantially equal to the charged composition. The TCD/MTF ring opening copolymer hydrogenates had the Mw of 31000, the hydrogenation ratio of 99.9% or more, and the Tg of 155° C. and the refraction index of 1.53.

Examples 54 to 56

Light guide plates were produced by the pellets of the production examples 1, 2 and 7 by injection molding under the same molding conditions as in the example 1.

The obtained light guide plates had V-shaped grooves (an apex angle of 90°, a pitch width of 0.05 to 00.1 mm near the light source and 0.5 to 2 mm near the end portion, the groove depth of about 80 μm being uniformly from near the light source to near the end portion) on the light emission surface 2c side, and furthermore, light convergence concave portions and convex portions 26 of a repetition of a prism shape having a pitch of 100 μm, height of 50 μm and apex angle of 90° were preferably formed as one body on the light lo emission surface 2b side without any transfer deficiencies.

Also, when examining visually whether or not the light guide plate surface were bubbling, the surface was not bubbling and was a preferable outlook. The total light transmittance of the light guide plate was 90% which was preferable.

Plane light source units of an edge light mode were produced by using the obtained light guide plates in the same way as in the example 1. Results of evaluation on luminance spots, color temperature and heat resistance by using the units are listed in Table 8.

Comparative Example 4

A light guide plate was produced in the same way as in the examples 54 to 56 excepting that the same polymethyl methacrylate as in the comparison example 1 was used. A little transfer deficiency was observed at some parts both in the V-shaped grooves 22 on the light reflection surface and on the light convergence concave portions and convex portions 26 on the light emission surface 2b side. When examining visually whether or not the light guide plate surface was bubbling, the surface was bubbling and voids were arisen. The total light transmittance of the light guide plate was 82% which was low.

Results of evaluation on luminance spots, color temperature and heat resistance by using the same plane light source unit as in the examples 54 to 56 are listed in Table 8. A preferable result was obtained on the color temperature, but the heat resistance was poor since there were size changes. The luminance spots were also poorer comparing with that in the examples 54 to 56.

Comparative Example 5

A light guide plate was produced in the same way as in the examples 54 to 56 excepting that the same polycarbonate as in the comparison example 2 was used. A little transfer deficiency was observed at some parts both in the V-shaped grooves 22 on the light reflection surface and on the light convergence concave portions and convex portions 26 on the light emission surface 2b side. When examining visually whether or not the light guide plate surface was bubbling, the surface was bubbling and voids were arisen. The total light transmittance of the light guide plate was 80% which was low.

Results of evaluation on luminance spots, color temperature and heat resistance by using the same plane light source unit as in the examples 54 to 56 are listed in Table 8. A preferable result was obtained on the heat resistance, but the color temperature was low and the luminance spots were also poorer comparing with that in the examples 54 to 56.

TABLE 8

|  | Luminance Spots (%) | Color Temperature | Heat Resistance Size Change (%) | Transferability |
|---|---|---|---|---|
| Examples 54 to 56 | 89 | ⊚ | 0 | ⊚ |
| Comparison Example 4 | 77 | ⊚ | 3 | x Bubbling |
| Comparison Example 5 | 73 | x | 0 | x Bubbling |

Note that the bubbling of PMMA is caused by heat discomposition and the bubbling in the PC is caused by Hydrogenation.

Consideration 3

From the Table 8, the plane light source units using the light guide plate of the examples 54 to 56 had higher luminance, less luminance spots, higher color temperature and excellent heat resistance than the units using the light guide plate of the comparative examples 4 and 5.

Also, the light guide plates of the comparative examples 4 and 5 had poorer transparency and poor efficiency of transferring the light convergence recesses and projections comparing with the light guide plates of the examples 54 to 56. Specifically, the transfer reproduction capability at the apex angle portion of a prism shape was poor and became round in the light guide plate of the comparative examples 4 and 5.

What is claimed is:

1. A light guide plate which is comprised of a polymeric resin having an alicyclic structure, which is selected from the group consisting of a norbornene-based polymer, a monocyclic cyclic olefin-based polymer, a cyclic conjugated diene-based polymer, a vinyl alicyclic hydrocarbon polymer, and hydrogenates of the same, and includes recesses for reflection formed on a light reflecting surface, the recesses being so arranged that the density of the recesses increases with the distance from a light source.

2. The light guide plate as set forth in claim 1, wherein said recesses are V-shaped grooves each having an angle of 70° to 150° and a depth of 1 μm to 1000 μm.

3. The light guide plate as set forth in claim 1, wherein said recesses are grooves formed to extend in an approximately vertical direction with respect to a direction in which a light is incident at any position on the light reflection surface.

4. The light guide plate as set forth in claim 2, further comprising projections formed respectively near edges of said recesses.

5. The light guide plate as set forth in claim 4, wherein the ratio of cross sectional areas of said recesses and said projections is 10:1 to 10:10.

6. The light guide plate as set forth in claim 4, wherein said projections are protruding portions formed respectively near one side edge or both side edges of said recesses.

7. The light guide plate as set forth in claim 1, wherein said polymeric resin having an alicyclic structure contains at least 10 wt % of repeating units composed of an alicyclic structure not having norbornane structure in the repeating units composed of all alicyclic structures.

8. The light guide plate as set forth in claim 1, being molded by injection molding.

9. The light guide plate as set forth in claim 1, wherein concave portions and convex portions for light convergence are formed integrally on a light emission surface opposing the light reflecting surface of the light guide plate.

10. The light guide plate as set forth in claim 1, wherein projections are formed respectively near edges of said recesses for reflection formed on the light reflection surface.

11. as set forth in claim 1, wherein concave portions and convex portions for light convergence are formed integrally on a light emission surface.

12. The light guide plate as set forth in claim 1, wherein said polymeric resin having an alicyclic structure has a water absorbant rate of not more than 0.3%.

* * * * *